(12) United States Patent
Bouché et al.

(10) Patent No.: US 12,486,401 B2
(45) Date of Patent: Dec. 2, 2025

(54) 'SMART' HYDROGEL FOR THE RADIOSENSITIZATION AND SUSTAINED DELIVERY OF THERAPEUTICS TRIGGERED BY IRRADIATION

(71) Applicant: The Trustees of the University of Pennsylvania, Philadelphia, PA (US)

(72) Inventors: Mathilde Bouché, Philadelphia, PA (US); David Cormode, Philadelphia, PA (US); Saad Sheikh, Pittsford, NY (US); Jay Dorsey, Media, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 711 days.

(21) Appl. No.: 17/593,982

(22) PCT Filed: Mar. 30, 2020

(86) PCT No.: PCT/US2020/025725
§ 371 (c)(1),
(2) Date: Sep. 29, 2021

(87) PCT Pub. No.: WO2020/205739
PCT Pub. Date: Oct. 8, 2020

(65) Prior Publication Data
US 2022/0177703 A1  Jun. 9, 2022

Related U.S. Application Data

(60) Provisional application No. 62/827,103, filed on Mar. 31, 2019.

(51) Int. Cl.
*C08L 85/02* (2006.01)
*A61K 9/06* (2006.01)
(Continued)

(52) U.S. Cl.
CPC ............ *C08L 85/02* (2013.01); *A61K 9/06* (2013.01); *A61K 41/0033* (2013.01);
(Continued)

(58) Field of Classification Search
CPC .. C08L 85/02; C08L 2201/06; C08L 2312/06; C08L 85/00; A61K 41/0033;
(Continued)

(56) References Cited

U.S. PATENT DOCUMENTS

2008/0166344 A1  7/2008  Nakahara
2010/0173347 A1  7/2010  Brook

FOREIGN PATENT DOCUMENTS

WO  2017173352 A1  10/2017

OTHER PUBLICATIONS

Fan et al, "X-ray Radiation-Controlled No-Release for On-Demand Depth-Independent Hypoxic Radiosensitization", Angew. Chem. Int. Ed., 2015, 54, pp. 14026-14030. (Year: 2015).*
(Continued)

*Primary Examiner* — Frederick F Krass
*Assistant Examiner* — Joshua A Atkinson
(74) *Attorney, Agent, or Firm* — Saul Ewing LLP; Kathryn Doyle; Sean P. Ritchie

(57) ABSTRACT

The present invention provides a hydrogel for comprising a biodegradable polyphosphazene polymer, a radiation-sensitive diselenide cross-linker; and one or more payloads releasably loaded within the hydrogel. The present invention further provides methods for radiosensitizing target tissues such as tumors and providing sustained delivery of therapeutics triggered by irradiation. In another aspect, the present invention provides a method that includes: introducing the hydrogel, as describes herein, adjacent to malignant or marginal tissue; and administering radiation to the hydrogel,
(Continued)

thereby disrupting the selenocystamine cross-linkers and releasing the one or more payloads.

20 Claims, 32 Drawing Sheets

(51) Int. Cl.
    *A61K 41/00*         (2020.01)
    *A61K 45/06*         (2006.01)
    *A61P 35/00*         (2006.01)
    *C08G 79/025*       (2016.01)

(52) U.S. Cl.
    CPC .......... *A61K 41/0057* (2013.01); *A61K 45/06* (2013.01); *A61P 35/00* (2018.01); *C08G 79/025* (2013.01); *C08L 2201/06* (2013.01); *C08L 2312/06* (2013.01)

(58) Field of Classification Search
    CPC .. A61K 41/0057; A61K 45/06; A61K 9/0019; A61K 47/34; A61P 35/00; C08G 79/025; C08G 79/02
    See application file for complete search history.

(56) References Cited

OTHER PUBLICATIONS

Qian et al, "Recyclable Self-Healing Polyurethane Cross-Linked by Alkyl Diselenide with Enhanced Mechanical Properties", Polymers, May 2019, 11(5): 773, pp. 1-12. (Year: 2019).*

Karimi et al, "Ultrasound irradiation in the production of ethanol from biomass", Renew. and Sust. Energy Rev., 2014, vol. 40, pp. 400-421. (Year: 2014).*

Cao et al, "gamma-Ray-Responsive Supramolecular Hydrogel Based on a Diselenide-Containing Polymer and a Peptide", Angew. Chem. Int. Ed., 2013, vol. 52, issue 24, pp. 6233-6237. (Year: 2013).*

Schwall et al, "Micro- and Nanoscale Hydrogel Systems for Drug Delivery and Tissue Engineering", Materials, 2009, vol. 2, issue 2, pp. 577-612. (Year: 2009).*

Conde et al, "Noble Metal Nanoparticles Applications in Cancer", Jour. Drug. Deliv., 2011, vol. 2012, 12 pages. (Year: 2011).*

Cao et al. "The Combination of Chemotherapy and Radiotherapy towards More Efficient Drug Delivery", Chem. Asian J., 2014, 9, pp. 48-57. (Year: 2014).*

Besse, H. C., et al., "Triggered radiosensitizer delivery using thermosensitive liposomes and hyperthermia improves efficacy of radiotherapy: An in vitro proof of concept study", PLOS One, Sep. 18, 2018, 17 pages.

Chun, C., et al., "Doxorubicin-polyphosphazene conjugate hydrogels for locally controlled delivery of cancer therapeutics", Biomaterials 30 (2009), 4752-4762.

Ma, N., et al., "Radiation-Sensitive Diselenide Block Co-polymer Micellar Aggregates: Toward the Combination of Radiotherapy and Chemotherapy", Langmuir, Apr. 13, 2011, 5874-5878.

Mehnath, S., et al., "Polyorganophosphazene stabilized gold nanoparticles for intracellar drug delivery in breast carcinoma cells", Process Biochemistry (2018), 10 pages.

Tian, Y., et al., "Diselenide-crosslinked zwitterionic nanogels with dual redox-labile properties for controlled drug release", Polym. Chem. 2020, 11, 2360-2369.

Symonds, P., et al., "Flash Radiotherapy: The Next Technological Advance in Radiation Therapy?", Clinical Oncology 31 (2019), 405-406.

International Search Report and Written Opinion, International Patent Application No. PCT/US2020/025725, Jun. 19, 2020.

* cited by examiner

A

B

'SMART' HYDROGEL FOR THE RADIOSENSITIZATION AND SUSTAINED DELIVERY OF THERAPEUTICS TRIGGERED BY IRRADIATION

CROSS-REFERENCE TO RELATED APPLICATIONS

This application is a national phase application under 35 U.S.C. 371 of International Application No. PCT/US2020/025725, filed Mar. 30, 2020, which claims the benefit of priority to U.S. Provisional Patent Application Ser. No. 62/827,103, filed Mar. 31, 2019. The entire content of each application is hereby incorporated by reference herein.

STATEMENT REGARDING FEDERALLY SPONSORED RESEARCH OR DEVELOPMENT

This invention was made with government support under CA181429, CA227142, and HL131557 awarded by the National Institutes of Health. The government has certain rights in the invention.

BACKGROUND OF THE INVENTION

Patients diagnosed with glioblastoma multiforme (GBM) usually go through extensive treatment, i.e. surgical tumor resection followed by radiation and chemotherapy infusion. However, over 70% of patients experience recurrence of the primary tumor and their two-year survival rate is only 27%.

SUMMARY OF THE INVENTION

In some embodiments, the present invention relates to a hydrogel having a biodegradable polyphosphazene polymer, a radiation-sensitive diselenide cross-linker; and one or more payloads releasably loaded within the hydrogel.

In some embodiments, the polyphosphazene includes a polycarboxylate polymer. In some embodiments, the polycarboxylate polymer comprises di(carboxylatophenoxy) phosphazene (PCPP).

In some embodiments, the radiation-sensitive cross-linker includes one or more selected from the group consisting of: selenocystamine, 3,3'-diselenodipropionic acid, 4,4'-diselenodibutanoic acid, 5,5'-diselenodipentanoic acid, diselenium functionalized polyurethane, and diselenium functionalized dextran.

In some embodiments, the radiation is one or more selected from the group consisting of: acoustic radiation, electromagnetic radiation and particle radiation. In some embodiments, the electromagnetic radiation comprises X-ray radiation. In some embodiments, the particle radiation comprises proton therapy or radioisotope decay. The radioisotope decay may include cobalt-60 decay. The acoustic radiation may include focused ultrasound radiation.

In some embodiments, the one or more payloads are selected from the group consisting of: nanoparticles and one or more chemotherapeutic agents. In some embodiments, the nanoparticles are selected from the group consisting of: gold nanoparticles (AuNP) and silver sulfide nanoparticles (Ag2S NP), gadolinium nanoparticles, europium nanoparticles, bismuth nanoparticles, iron oxide-containing nanoparticles, silver nanoparticles, tantalum nanoparticles, ytterbium nanoparticles, tungsten nanoparticles, alloys including alloys of one or more herein, compounds including compounds of one or more herein, and any combinations thereof. In some embodiments, the nanoparticles have a maximum cross-sectional dimension between about 1 nm and about 150 nm. In some embodiments, the nanoparticles have a maximum cross-sectional dimension less than about 5 nm. In some embodiments, the one or more chemotherapeutic agents are selected from the group consisting of: doxorubicin, quisinostat, carboplatin, cisplatin, paclitaxel, albumin-bound paclitaxel, docetaxel, gemcitabine, vinorelbine, irinotecan, etoposide, vinblastine, imiquimod, resiquimod and pemetrexed.

In another aspect, the present invention provides a method that includes: introducing the hydrogel, as describes herein, adjacent to malignant or marginal tissue; and administering radiation to the hydrogel, thereby disrupting the selenocystamine cross-linkers and releasing the one or more payloads.

In some embodiments, the hydrogel is introduced after resection of malignant tissue. In some embodiments, the hydrogel is introduced by injection.

In some embodiments, wherein radiation is one or more selected from the group consisting of: electromagnetic radiation, particle radiation, and acoustic radiation.

In some embodiments, the radiation is administered after a period of time selected from the group consisting of: between 1 hour and 1 week, between 1 week and 2 weeks, between 2 weeks and 3 weeks, between 3 weeks and 4 weeks, between 4 weeks and 8 weeks, between 8 weeks and 12 weeks, between 12 weeks and 16 weeks, and greater than 16 weeks.

In some embodiments, the administering step is repeated a plurality of times; and the hydrogel releases a portion of the payload after each repetition.

In some embodiments, the present invention provides a hydrogel, as described herein, for use as an anti-cancer therapeutic.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIGS. 2A and 2B depict quantification of Ki67 and Caspase staining, respectively, following quisinostat treatment in five distinct GBO cell lines. FIG. 2C depicts light microscopy images of spheroids following control and quisinostat treatment. FIG. 2D depicts fluorescence microscopy images of cell viability marker Ki67 following quisinostat treatment.

FIG. 3A depicts results of a high throughput screen of over 3000 compounds. FIG. 3B depicts validation of the activity of lead compounds via bioluminescence imaging. FIG. 3C depicts IC50 values found for lead compounds against normal human astrocytes (NHA) and glioblastoma cell lines (NS039 and T4213). FIG. 3D depicts validation of the in vitro anti-glioblastoma activity of quisinostat by bioluminescence imaging.

FIG. 4A depicts a photograph of the Se-PCPP hydrogel loaded with 0.5 mg quisinostat and 10 mg AuNP per 1 mg of PCPP, before and after the vial inversion test. FIG. 4B depicts photographs of the Se-PCPP hydrogel non-loaded, or loaded with 10 mg AuNP, 0.5 mg doxorubicin or 0.5 mg FITC-BSA per 1 mg of PCPP, from left to right. FIG. 4C depicts UV-vis spectra of Se-PCPP hydrogel with increasing loading of AuNP (from 1 mg to 10 mg AuNP for 1 mg PCPP) compared to free AuNP. FIG. 4D depicts representative TEM of the Se-PCPP hydrogel in dry state loaded with 5 mg AuNP/mg PCPP. FIG. 4E depicts FT-IR spectra of the non-loaded and AuNP loaded Se-PCPP hydrogel, and comparison to free selenocystamine and free PCPP.

FIG. 5C depicts viability of U251 (blue) and NS039 (red) cells after incubation with cell medium treated with either the eluted drug from the non-irradiated Se-PCPP loaded with quisinostat or the radiation released drug from the Se-PCPP loaded with quisinostat and irradiated with 60 Gy.  and * indicate a difference at $p<0.01$ or $0.001$ respectively.

FIGS. 7A to 7C depicts in vivo evaluation of the antitumoral effect of the quisinostat loaded Se-PCPP hydrogel and tolerability over 100 days. FIG. 7A illustrates exemplary experimental design. FIGS. 7B to 7D depict the evaluation of the mouse weights (FIG. 7B) and tumor growth (FIG. 7C) over 100 days. FIG. 7D depicts data shown in FIG. 7C with a focus on 55 to 100 days post treatment. * and *** indicate a difference at $p<0.05$ or $0.001$, respectively, while ns indicates a non-significant difference.

FIG. 8A depicts CT scans at 1 day and 30 days post-injection; the circles indicate the hydrogel. The window levels are 575 HU and the window widths are 1250 HU. FIG. 8B depicts 3D reconstruction of the hydrogel based on contrast-enhanced CT image, AuNP loaded hydrogel was artificially colored in gold based on intensity thresholding using the same window levels and widths as in A.

FIG. 12A depicts quantification of the drug loading efficiency by comparing the absorbance of the non-encapsulated drug to the stock solution by UV-Vis spectroscopy. Analysis of the bulk hydrogel by TEM is shown in FIG. 12B, elemental mapping of P (blue), Au (yellow) and Se (violet) is shown in FIG. 12C, and SEM is shown in FIG. 12D. FIG. 12E depicts EDX spectra of Se-PCPP hydrogel with various loadings, AuNP, FITC-BSA, doxorubicin and quisinostat respectively from top to bottom.

FIG. 13A depicts an exemplary picture of the non-loaded Se-PCPP hydrogel during the injection process. FIG. 13B depicts the measurement of the injection force of the hydrogel with various loadings. Rheological evaluation of the shear-thinning are shown in FIG. 13C and self-healing abilities of the Se-PCPP hydrogel are shown in FIG. 13D. G' and G" correspond to the storage modulus and loss modulus respectively, with a low strain of 0.2% strain and a high strain of: 500% strain, 10 Hz.

FIG. 14A depicts TEM of the Se-PCPP hydrogel loaded with increasing amounts of AuNP from left to right. FIG. 14B depicts variations in gold per phosphorous content while increasing the AuNP concentration in the Se-PCPP hydrogel. FIG. 14C depicts contrast enhancement of the hydrogel with increasing AuNP concentration, and FIG. 14D depicts linear correlation of the CT attenuation to the Au per P ratio of the hydrogel (error bars representing the attenuation variation among triplicate samples—where not visible, the error bars are concealed by the data marker).

FIG. 15B depicts quantification of the released gold from the hydrogel irradiated with high X-ray dose of 60 Gy (filled) compared to mock irradiation (empty). FIG. 15C depicts the quantification of the released drug from the Se-PCPP hydrogel containing quisinostat (orange), doxorubicin (red) or FITC-BSA (green) at high X-ray dose of 60 Gy (filled) compared to mock irradiation (empty). FIG. 15D illustrates the loss of flowability of the irradiated hydrogel (grey) compared to hydrogel stored at room temperature (red) or 37° C. (black). 'ns' indicates non-significant difference with $p>0.05$, while * and ** indicate a significant difference at $p<0.05$ and $p<0.01$, respectively.

16B depicts viability of glioblastoma cell lines exposed to media conditioned with AuNP-loaded Se-PCPP hydrogel, with and without X-ray degradation. 'ns' indicates the non-significant difference with p>0.05.

Figures 17A, 17B:
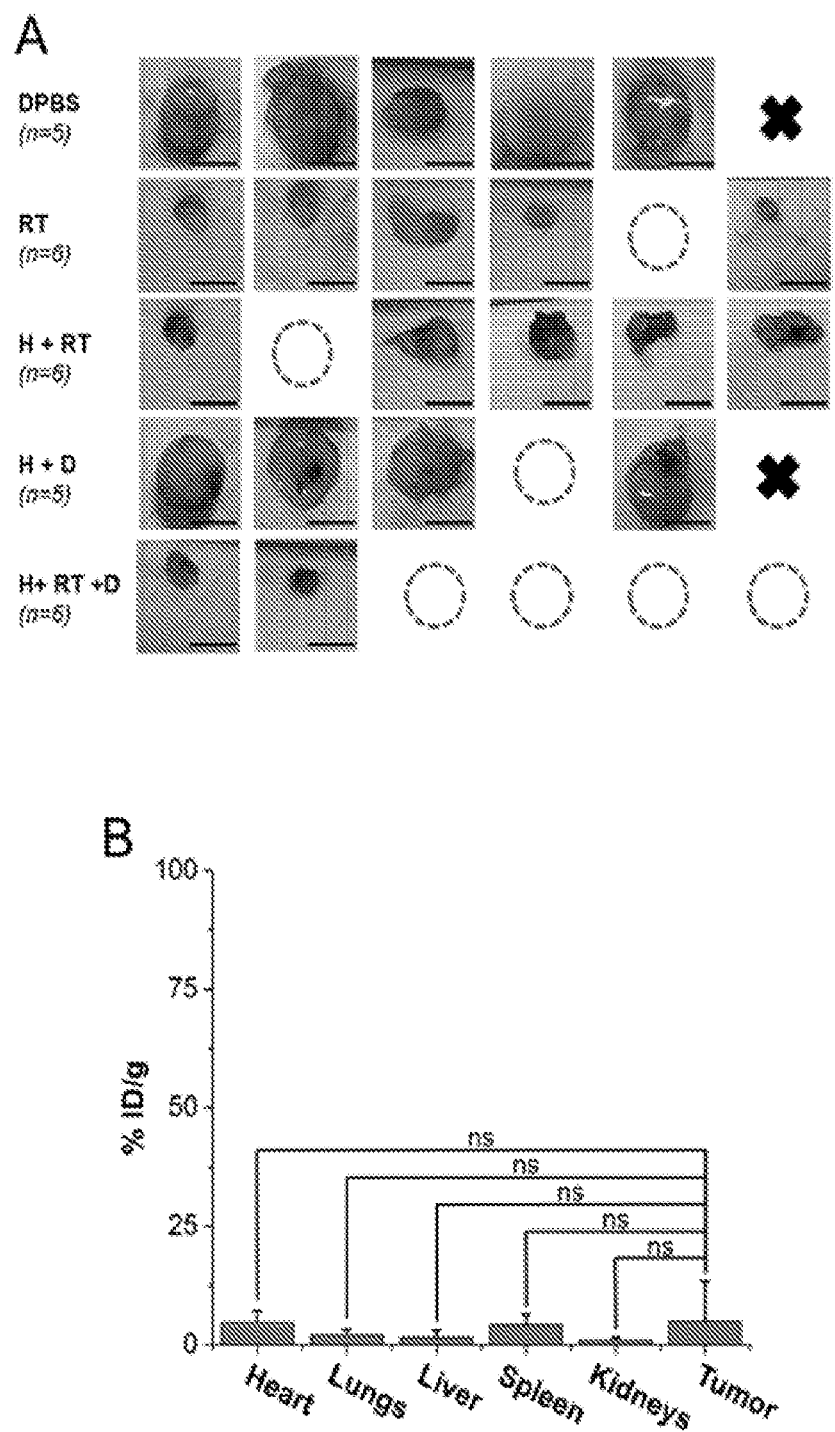

FIG. 17A depicts photographs of the tumors after harvesting; scale bar 1 cm; the black cross indicates the mouse died before treatment administration. FIG. 17B depicts biodistribution in major organs of the AuNP released from the Se-PCPP hydrogel in group 'H+drug+RT'. 'ns' indicates the non-significant difference with p>0.05.

Figure 18:
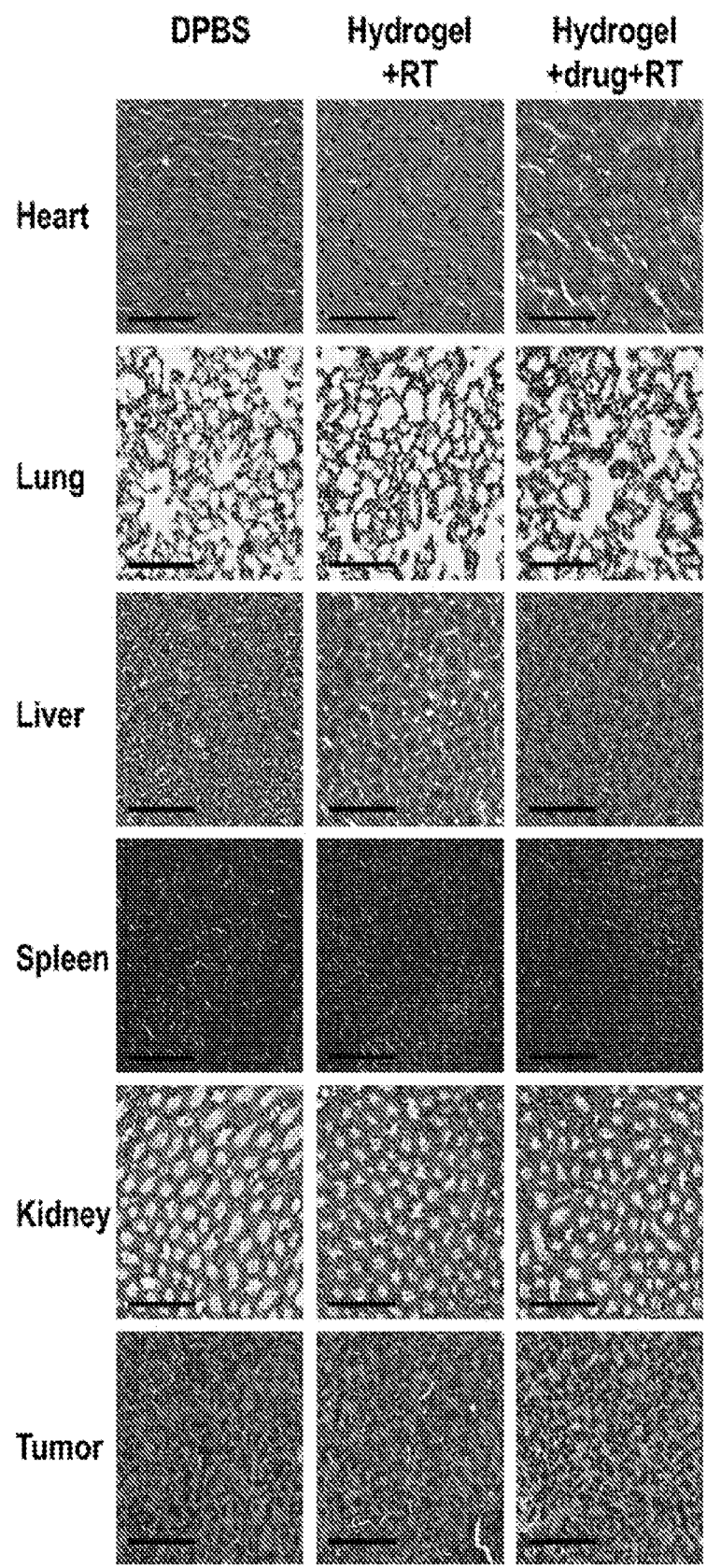

FIG. 18 depicts histopathological investigation comparing representative H&E stained micrographs from the control group (left) to the effect of the drug loaded Se-PCPP hydrogel (right) on major organs, i.e. heart, lung, liver, spleen, kidney, and the tumor. The scale bars correspond to 200 μm.

Figure 19:
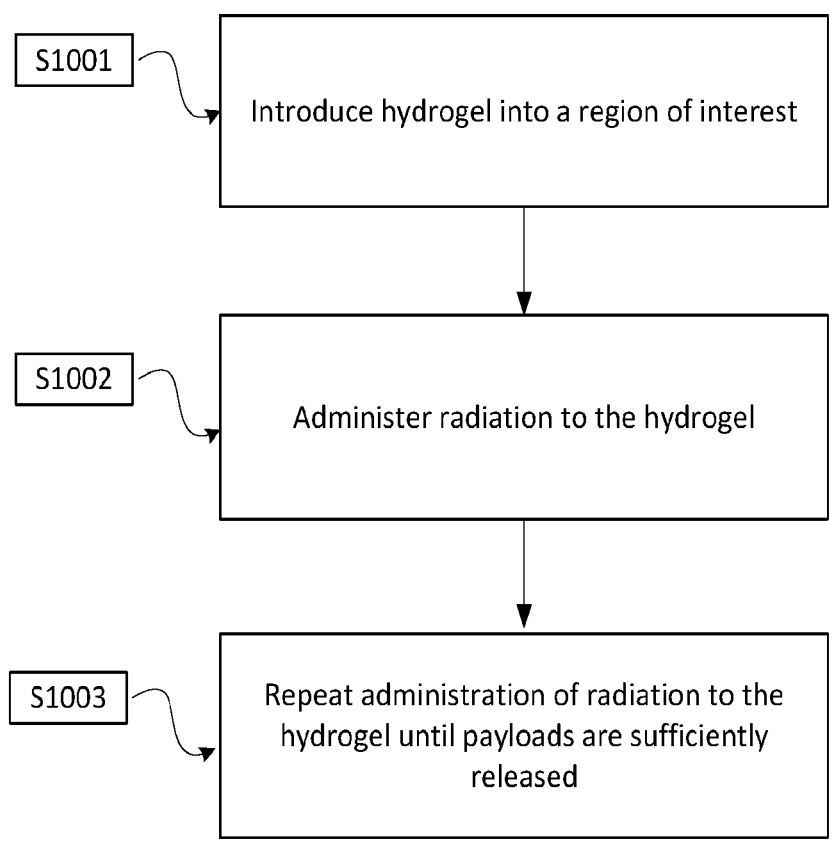

FIG. 19 depicts an exemplary method of the present invention.

Definitions

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

The present invention provides therapeutic agents for the treatment of one or more indications including cancer in a subject in need thereof. The therapeutic agents of the present invention include biodegradable hydrogel compositions that contain one or more payloads including one or more nanoparticles and/or one or more chemotherapeutic agents. The present invention also provides methods for generating the therapeutic hydrogel compositions described herein as well as methods for treating a subject in need with one or more hydrogel compositions as described herein. The subject in need may be a subject with one or more diseases or disorders including one or more surgically resectable cancers or tumors such as one or more of glioblastoma multiforme (GBM), lung cancer, head and neck cancer, sarcoma, other gliomas, pancreatic cancer, liver cancer, kidney cancer, and the like.

Biodegradable Hydrogels

Embodiments of the biodegradable hydrogels of the present invention include hydrogels formed from one or more anionic polymers, and one or more cationic cross-linkers. The one or more anionic polymers may be one or more polyphosphazenes polymers including one or more polycarboxylate polymers, (e.g., polydi(carboxylatrophenoxy)phosphazene (PCPP), alginate, polyaspartic acid, and/or combinations thereof). The one or more polymers may include inorganic material including, for example, one or more functionalized mesoporous silicas.

The one or more cationic cross-linkers can include one or more radiation-sensitive cross-linkers. The one or more radiation-sensitive cross-linkers can be one or more diselenide cross-linkers including selenocystamine. The one or more cross-linkers may include any diselenium-containing small molecules or polymers, including for example 3,3'-diselenodipropionic acid, 4,4'-diselenodibutanoic acid, 5,5'-diselenodipentanoic acid, diselenium functionalized polyurethane, diselenium functionalized dextran, among others. The one or more cationic cross-linkers can include one or more polymers having the opposite charge to the one or more anionic polymers making up the hydrogel. In some embodiments, the one or more cross-linkers include one or more diselenide moieties covalently linked to one or more appropriate polymers.

The one or more radiation-sensitive cross-linkers may be activated or disrupted when exposed to one or more sources of radiation, including electromagnetic radiation, particle radiation, and acoustic radiation. The radiation may be applied to the hydrogel containing the one or more radiation-sensitive crosslinkers in a single dose, in multiple fractional doses, and the like.

The one or more sources of electromagnetic radiation include X-ray radiation administered by any suitable means as understood in the art, such as planar or two-dimensional X-ray radiography, computed tomography (CT), and the like. The applied X-rays can have sufficient photon energies to disrupt cross-bridge formation. Such photon energies include up to about 1 keV, about 1 keV to about 100 keV, about 1 keV to about 1000 keV, about 1 keV to about 10,000 keV, greater than 10,000 keV and the like.

The one or more sources of particle radiation may include one or more suitable radioisotopes, whose decay emits one or more sufficiently charged particles to activate or disrupt radiation-sensitive cross-bridges within the hydrogel. The one or more radioisotopes may include cobalt-60, iridium-192, and the like. The one or more sources of particle radiation may include administration of proton therapy and carbon ion radiation in a therapeutic range of energy.

The one or more sources of acoustic radiation may include focused ultrasound. The focused ultrasound may have a frequency of up to about 1 MHz, about 1 MHz to about 5 MHz, about 5 MHz to about 10 MHz, about 10 MHz to about 15 MHz, about 15 MHz to about 20 MHz, and any all combinations therebetween.

The cross-linker-to-polymer concentration ratio may include from about 0.01 mg to about 10 mg cross-linker per 1 mg of polymer. The cross-linker to polymer concentration ratio may be about 0.01 mg to about 0.1 mg cross-linker per 1 mg polymer, about 0.1 mg to about 1 mg cross-linker per 1 mg polymer, about 1 mg to about 10 mg cross-linker per 1 mg polymer, and the like. In some embodiments, the hydrogels are formed from one or more cationic polymers and one or more anionic cross-linkers including one or more appropriate cationic polymers cross-linked with one or more appropriate anionic polymers.

The hydrogels of the present invention further consist of one or more payloads including one or more nanoparticles and/or one or more therapeutic agents including chemotherapeutic agents. The one or more nanoparticles can include one or more radiosensitizing agents and/or one or more radiation-attenuating contrast agents, including gold nanoparticles, gadolinium nanoparticles, europium nanoparticles, bismuth nanoparticles, iron oxide-containing nanoparticles, silver nanoparticles, tantalum nanoparticle, ytterbium nanoparticle, tungsten nanoparticles, alloys including alloys of one or more herein, compounds including compounds of one or more herein, any combinations thereof, and the like.

The one or more nanoparticles may have a diameter or maximum cross-sectional dimension of about 1 nm to about 5 nm, about 1 nm to about 10 nm, about 1 nm to about 50 nm, about 1 nm to about 100 nm, about 1 nm to about 150 nm, 1 nm to about 200 nm, or more than about 200 nm.

In some embodiments, the one or more nanoparticles enhance the efficacy of secondarily applied radiation therapy. In some embodiments, the one or more nanoparticles improve the detection of the region of interest by one or more modalities including X-ray imaging, CT imaging, magnetic resonance imaging and the like. In some embodiments, the nanoparticles are plasmonic nanoparticle that can generate local heating when exposed to certain wavelengths.

The one or more chemotherapeutic agents may include one or more therapeutic compound including doxorubicin, quisinostat, carboplatin, cisplatin, paclitaxel, albumin-bound paclitaxel, docetaxel, gemcitabine, vinorelbine, irinotecan, etoposide, vinblastine, pemetrexed, imiquimod, resiquimod, other therapeutic proteins, and the like. The one or more chemotherapeutic agents may have a concentration within the hydrogel of about 0.01 mg to about 5 mg chemotherapeutic agent per 1 mg of polymer.

The one or more hydrogels of the present invention may be formed by cross-linking one or more free polycarboxylate polymers (e.g. PCPP) with one or more diselenide cross-linkers (e.g. selenocystamine), as described herein.

Methods of Administering Biodegradable Hydrogels

Embodiments of the present invention include methods for treating a subject in need thereof with one or more biodegradable hydrogels as described here. The methods may include methods applying improved radiotherapy in a subject using one or more hydrogels provided herein. The methods may include delivering a therapeutic agent to a target tissue in a subject in need thereof. The methods may include radiosensitizing a target tissue in a subject. The subject may be a patient with one or more target tissues. The target tissue may include one or more tumors, for example surgically resectable tumors such as glioblastoma multiforme, lung cancer, head and neck cancer, sarcoma, other gliomas, pancreatic cancer, liver cancer, kidney cancer, and the like. The subject may be a mammal. The patient may be a human.

Referring now to FIG. 19, step S1001 of method 1000 includes introducing the one or more hydrogels into a region of interest. The region of interest includes one or more tissues including any malignant or marginal tissue. The malignant or marginal tissue may include tissue from a tumor or organ containing a tumor. The tumor may include one or more of a glioblastoma multiforme, other glioma, lung tumor, head and neck tumor, sarcoma, and the like. The hydrogel may be administered by one or more suitable techniques included injection with a syringe.

Step S1002 includes administering radiation to the hydrogel. The radiation may include electromagnetic radiation, particle radiation, FLASH radiotherapy, one or more other therapeutic radiation therapies as understood in the art, and/or one or more combinations thereof. The electromagnetic radiation can include X-ray radiation administered at a sufficient dose to disrupting the one or more radiation-sensitive cross-linkers including selenocystamine cross-linkers and releasing the one or more payloads, including the one or more chemotherapeutic agents. The radiation may be applied to locate, track or otherwise identify the administered or injected hydrogel. The radiation may be administered as a first administration to track the hydrogel, a second administration to disrupt the hydrogel and/or radiosensitize the targeted tissue, and/or a third administration of radiotherapy to deliver an effective dose of radiation to the target tissue. In some embodiments, a single administration of radiation is used to track the hydrogel, disrupt the hydrogel, and deliver a therapeutic dose or dosage regime of radiation to the target tissue. In some embodiments, a plurality of administrations of radiation is used.

The X-ray radiation can be administered after a period of time following surgical resection of the tumor, wherein the period is selected from the group consisting of: between 1 hour and 1 week, between 1 week and 2 weeks, between 2 weeks and 3 weeks, between 3 weeks and 4 weeks, between 4 weeks and 8 weeks, between 8 weeks and 12 weeks, between 12 weeks and 16 weeks, and greater than 16 weeks. The administered X-ray radiation can have sufficient photon energies to disrupt cross-bridge formation. Such photon energies include up to about 1 keV, about 1 keV to about 100 keV, about 1 keV to about 1000 keV, about 1 keV to about 10,000 keV, greater than 10,000 keV and the like.

Step S1003 includes repeating the administration of radiation to the hydrogel. Administration of radiation, step S1003, may be repeated until sufficient disruption of the hydrogel is achieved and/or sufficient delivery of the one or more payloads to the region of interest is accomplished. For example, step S1003 is repeated until a tissue concentration of nanoparticles and/or therapeutic agent such as a drug reaches a therapeutically effective concentration, wherein a therapeutically effective concentration is one that results in a desired biological response. The desired biological response may include malignant tissue death, lack of tumor regrowth, healthy tissue growth, tissue visibility using one or more imaging modalities, and the like. The concentration of nanoparticles may be detected and used to approximate the tissue concentration of the drug or other therapeutic agent. That is, the detected concentration of nanoparticles may be correlated to the tissue concentration of the therapeutic agent or drug.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Example 1

Glioblastoma (GBM) is the most common and aggressive form of primary brain tumor; it can severely affect a patient's physical and neurological condition, and the median survival is less than 15 months. The standard clinical care for GBM management, the Stupp protocol, involves surgical resection up to 1 cm away from the borders of the main tumor, followed by a combination of CT-guided fractionated radiotherapy and chemotherapy. Despite this intense combination of therapies, the 2.5-year survival rate is only 8%. The lack of effectiveness of such treatment partly arises from low drug delivery to the tumor site and an inability to deliver curative radiation without deleterious side effects.

Materials Methods

Materials

Gold (III) chloride trihydrate, sodium borohydride, poly (bis(4-carboxyphenoxy)phosphazene) disodium salt (PCPP, 1 MDa), L-glutathione reduced (GSH), selenocystamine dihydrochloride, hexamethylenediamine, doxorubicin and albumin-fluorescein conjugate were purchased from Sigma-Aldrich (St. Louis, MO). Quisinostat dihydrochloride was purchased from Selleckchem (Houston, TX). HepG2, U251, Renca, and SVEC4-10 cell lines were purchased from ATCC (Manassas, VA). LIVE/DEAD assay kits were purchased from Life Technologies Invitrogen (Grand Island, NY). Cells were cultured in Dubecco's Modified Eagle Medium supplemented with 10% fetal bovine serum and 1% penicillin (10000 units/mL) from Life Technologies Invitrogen (Grand Island, NY). Athymic nude mice were obtained from Charles River Labs (stock #490).

Cell Based High Throughput Death Receptor Screen

High throughput screening (HTS) was performed by the HTS core at the University of Pennsylvania. U251 DR5-Luc cells were plated at $2.0 \times 10^3$ cells/well across ten 384 well plates. Plates were then incubated in a humidified environment at 37° C. and 5% $CO_2$ for twenty-four hours. Compound from the Selleckchem Bioactive Compound Library I was added to each well at 100 nM (approximately 3200 compounds). Tunicamycin (100 nM) and DMSO (0.1% v/v) served a positive and negative plate controls. Brite-Lite (PerkinElmer, Waltham, MA) reagent was added all plates twenty-four hours following the addition of compound, and plates were assayed on Envision Xcite (PerkinElmer) plate reader. The mean ($\mu$) and standard deviation ($\sigma$) for each plate was used to transform total flux for each compound ($x_i$) into z-scores using the formula $z=(x_i-\mu/\sigma)$. Calculation of Z-prime for this screening assay was based upon the formula set forth by Zhang et al utilizing Tunicamycin and DMSO as a positive and negative controls respectively. Positive hits were identified as compounds that produced z-prime values greater than Tunicamycin. Reporter activity was validated following compound incubation and bioluminescence imaging on the IVIS spectrum (PerkinElmer).

Western Blot Analysis

Western blot analysis was performed using standard techniques as understood in the art, including those described at least by S. Sheikh et. al., Mol. Cancer Res. 2019, 17 (5), 1102-1114.

Compound Dilution Studies and Cell Viability

Cells were plated at density of $7.5-1.0 \times 10^4$ cells/well in 96 well plates using their respective media. Plates were then incubated in a humidified environment at 37° C. and 5% $CO_2$ for twenty-four hours. An eleven-point dilution series of positive hits from our HTS screen was added to each plate. Cells treated with 0.1% DMSO served as a vehicle control. Plates were incubated with compound for seventy-two hours at 37° C. and 5% $CO_2$, followed by addition of Cell Titer Glo® (Promega). Bio-luminescent readings were obtained using a Synergy HT luminometer (BioTek, Winooski, VT). Raw bio-luminescent values were normalized to their vehicle treated controls, and then fit to a modified Hill Equation using OriginPro 8 (OriginLab, Northampton, MA) in order to calculate $IC_{50}$ values. All dilution series experiments were performed as biological triplicates.

Sphere Formation Assay

T4213 and NS039 cells were plated at 2000 cells/well in six well plates in the presence of 0.1% DMSO or 1.0 μM Quisinostat in biological triplicate for twelve days. On day twelve, individual wells were imaged on a Lionheart Fx microscope at 4× magnification following addition of NucBlue™ (Hoechst 33342, Invitrogen). Circular blue objects greater than 50 μm in diameter and less than 750 μM were counted as neurospheres. Differences in sphere formation between cells and treatments were assessed using a one-way ANOVA followed by post-hoc Tukey's test in GraphPad Prism 8. P-values less than 0.05 were considered significant.

Primary Brain Tumor Specimens

The use of primary tumor tissue was coordinated following ethical and technical guidelines on the use of human samples for biomedical research purposes. Patient glioblastoma tissue and were collected after informed patient consent. All patient samples were de-identified before processing. Mutational status of clinical glioblastoma tissue was made available from a routinely performed clinical sequencing panel.

Brain Tumor Organoids, Compound Incubation, and Viability

Glioblastoma organoids (GBOs) were generated from primary brain tumor as previously described.3 Briefly, primary brain tumor specimens were minced into approximately 1 mm pieces following clinical confirmation of pathologic diagnosis and incubated in GBO medium containing 50% DMEM:F12 (Thermo Fisher Scientific), 50% Neurobasal (Thermo Fisher Scientific), 1× GlutaMax (Thermo Fisher Scientific), 1× NEAAs (Thermo Fisher Scientific), 1× PenStrep (Thermo Fisher Scientific), 1× N2 supplement (Thermo Fisher Scientific), 1× B27 w/o vitamin A supplement (Thermo Fisher Scientific), 1× 2-mercaptoethanol (Thermo Fisher Scientific), and 2.5 m/ml human insulin (Sigma) per well and placed on an orbital shaker rotating at 120 rpm within a 37° C., 5% CO2, and 90% humidity sterile incubator. Organoids would generally form 2-4 weeks following initial culturing. Organoids were then incubated in GBO containing media containing either DMSO (0.1%) or 1.0 µM quisinostat with media changes every two days for seven days total. Post-treatment images were taken on brightfield microscope and samples were subsequently fixed in 4% paraformaldehyde×30 minutes for immunofluorescence analysis.

Immunofluorescence

Serial tissue sections (20 µm) were sliced using a cryostat (Leica, CM3050S), and melted onto charged slides (Thermo Fisher Scientific). Slides were dried at room temperature and stored at −20° C. until ready for immunohistology. For immunofluorescence staining, the tissue sections were outlined with a hydrophobic pen (Vector Laboratories) and washed with TBS containing 0.1% Tween-20 (v/v). Non-specific binding was blocked using a solution containing 10% donkey serum (v/v), 0.5% Triton X-100 (v/v), 1% BSA (w/v), 0.1% gelatin (w/v), and 22.52 mg/ml glycine in TBST for 1 hour at room temperature. The tissue sections were incubated with primary antibodies against KI67 (BD Biosciences Cat #550609) and Cleaved-Caspase 3 (Cell Signaling Technology CAT #9661). diluted in TBST with 5% donkey serum (v/v) and 0.1% Triton X-100 (v/v) overnight at 4° C. After washing in TBST, the tissue sections were incubated with secondary antibodies (Alexa Fluor 555 and 647 respectively) diluted in TBST with 5% donkey serum (v/v) and 0.1% Triton X-100 (v/v) for 1.5 hours at room temperature. After washing with TBST, sections were incubated with TrueBlack reagent (Biotium) diluted 1:20 in 70% ethanol for 1 minute to block autofluorescence due to lipofuscin and blood components. After washing with DPBS, slides were mounted in mounting solution (Vector Laboratories), cover-slipped, and sealed with nail polish.

GBOs were imaged on a Zeiss LSM 710 confocal microscope (Zeiss) using a 20× objective with Zen 2 software (Zeiss). Images were quantified and analyzed using ImageJ software. Graphical and statistical analysis was performed using GraphPad Prism 8 software.

Orthotopic Tumor Implantation and Treatment with Quisinostat

Figures 5A, 5B, 5C:
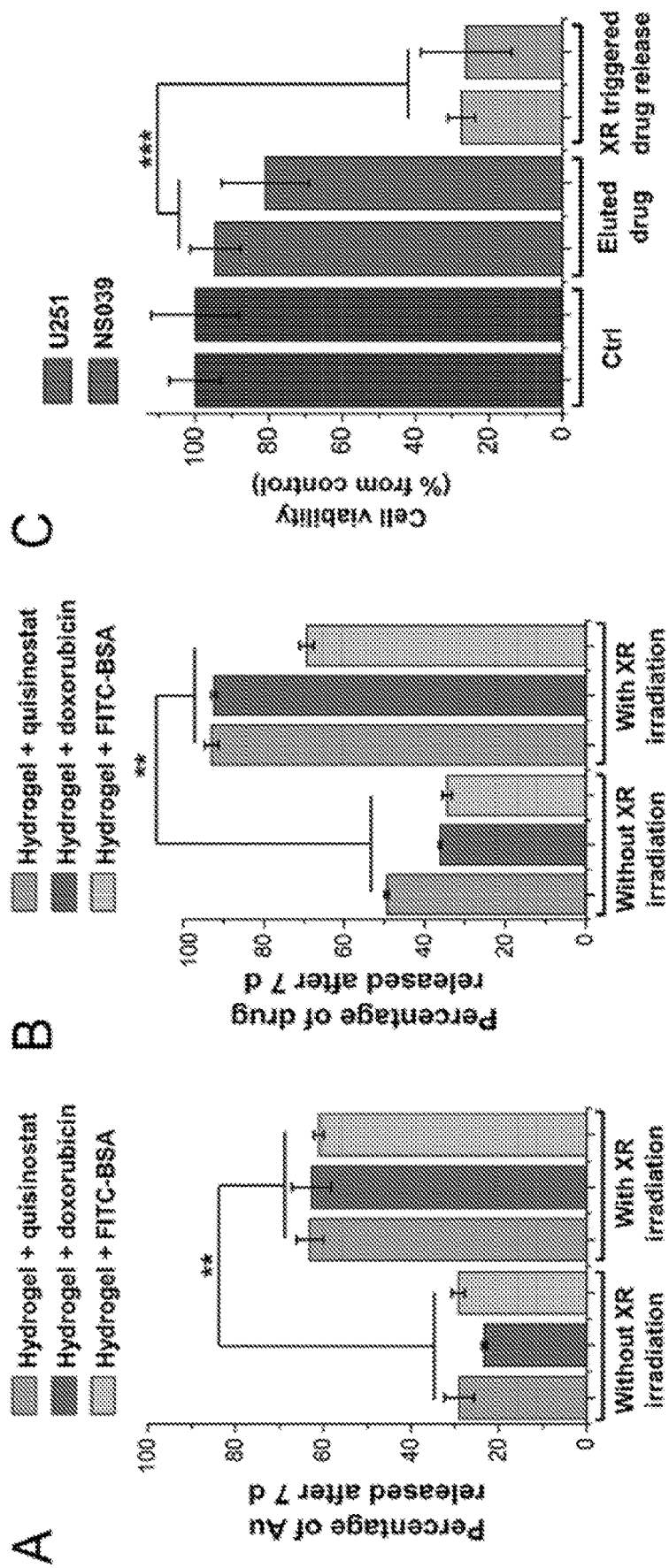
FIGS. 5A to 5C depict probing the radiation triggered degradation of the Se-PCPP hydrogel. A comparison is shown of the release (after 7 days incubation) of AuNP (FIG. 5A) and drugs (FIG. 5B), between mock irradiation (left) and 60 Gy radiation triggered degradation (right), from the Se-PCPP hydrogel containing quisinostat (orange), doxorubicin (red) or FITC-BSA (green).

T4213 cells were stably modified using a lentiviral vector containing GFP and Luciferase (Biosettia, San Diego, CA). Cells were resuspended in serum free media, and then $3.0 \times 10^5$ cells were stereotactically injected into the right striatum of five-week female athymic nude mice (Charles River Labs). Tumor bioluminescence was quantified on the IVIS spectrum (PerkinElmer, Hopkinton, MA) following intraperitoneal administration of D-Luciferin (Goldbio, St Louis MO) two days following cell implantation. In a separate experiment, mice underwent serial bioluminescent imaging following orthotopic T4213 implantation. Mice were assigned to different treatment groups such that the total flux (photons/s) was equivalent between groups (6.4× $10^6$ photons/s). Treatment was initiated immediately following bioluminescent imaging, and consisted of once daily intraperitoneal administration of 2-Hydroxypropyl-β-cyclodextrin (vehicle, Cayman Chemical, Ann Arbor MI) or 10 mg/kg Quisinostat (Cayman Chemical) for a total of eight doses (FIG. 5A). Mice were given a seventy-two-hour break between treatments if they demonstrated weight loss, dehydration, or lethargy (FIG. 5B). Bioluminescent imaging was repeated seventy-two hours after the last treatment was administered. Mice were weighed two to three times per week throughout all experiments until they met criteria for humane euthanasia (loss of 20% of body weight, neurologic deficits). Following human euthanasia brains were carefully removed and stored in 10% Neutral Buffered Formalin at 4° C. Select brains were sent to the Cancer Histology Core for paraffin embedding followed by hematoxylin and eosin staining. Serial bioluminescence was assessed using a one-way repeated measures ANOVA followed by a post-hoc Tukey test. Post-treatment total flux was background corrected, and the percent change in total flux was analyzed using a Mann-Whitney U test. Both analyses were performed in GraphPad Prism 8, and p-values less than 0.05 were considered significant.

Gold Nanoparticle Synthesis

The gold nanocrystals were synthesized via a modification of the method of Turkevich by reduction of gold (III) chloride with sodium borohydride and subsequent surface modification with a stabilizing ligand. $AuCl_3 \cdot 6H_2O$ was dissolved in DI $H_2O$ (8 mg·mL$^{-1}$, 100 mL) under stirring. A freshly prepared solution of $NaBH_4$ (5 mg·mL$^{-1}$, 2 mL DI $H_2O$) was dropped to the gold chloride solution and allowed to stir at room temperature for 20 min. Then, a solution of the capping GSH (5.2 mg·mL$^{-1}$, 1 mL DI $H_2O$) was added to the mixture, which was further transferred to 50 mL plastic tubes and incubated at 4° C. overnight. Concentration and purification of AuNP were performed using molecular weight cut off tubes (10 kDa MWCO tubes), centrifuged at 4 k rpm, rinsed trice with DI $H_2O$ to afford the purified AuNP. Inductively coupled plasma optical emission spectroscopy (ICP-OES) was performed on a Spectro Genesis ICP to determine the final gold concentration of the stock solution.

Se-PCPP Hydrogel Formulation

Se-PCPP hydrogel: A mixture of 1 mL PCPP (4 mg·mL$^{-1}$, PBS) and 10.3 mg $Na_2HPO_4$ were mixed together and pH was adjusted to 7.4 by addition of HCl (1 M). Next, 1.4 µL of selenocystamine dihydrochloride (110 mg·mL$^{-1}$, PBS) were added to the mixture and vortexed for 30 seconds. The mixture was dropping into 10 mL of a $CaCl_2$ (8.8%, DI $H_2O$) and left to react under vigorous stirring for 20 minutes at room temperature. Finally, the solution was transferred to conical tubes and centrifuged at 2 k rpm for 8 min. The supernatant was discarded, and the pellet was re-suspended in DI water. After repeating this process three times, the Se-PCPP solution was re-suspended in DI water, vortexed at 14 k rpm and stored at 4° C. The final concentration of AuNP in the sample was determined using ICP-OES performed on a Spectro Genesis ICP.

Cargo loaded Se-PCPP hydrogel: For the cargo loaded Se-PCPP hydrogel, the PCPP (4 mg/mL, PBS) solution was mixed with the desired amount of cargo (solutions of doxorubicin, FITC-BSA or quisinostat at 1 mg/mL) and 10.3 mg $Na_2HPO_4$. The total volume was completed to 2 mL with PBS, pH was adjusted to 7.4 by addition of HCl (1 M) and incubated for 10 minutes before cross-linking with selenocystamine dihydrochloride as described above. The final drug concentration in the sample were determined using UV-Vis spectroscopy by determining the loading efficiency (LE), calculated as follows:

% LE=([stock drug]−[non-loaded drug]/[stock drug])*100.

C-PCPP hydrogel The non-X-ray sensitive hydrogel was synthesized following the same procedure as described above, using a solution of hexamethylenediamine (65 mg·mL$^{-1}$) for cross-linking and hydrogel formation, in place of selenocystamine.

Hydrogel Characterization

UV-Vis spectroscopy The UV-vis absorption spectrum of GSH-AuNP and Se-PCPP hydrogels were recorded on a UV/visible spectrophotometer (Thermo Fisher Scientific, USA) after dilution in DI water.

Transmission electron microscopy (TEM) For air-dried samples, six microliters of hydrogel suspension in DI H$_2$O ([P]=0.5 mg/mL) were deposited onto a copper grid and the sample was air-dried for a minimum of 24 hours prior image acquisition. For embedded samples, hydrogels were fixed with 2% paraformaldehyde and 2.5% glutaraldehyde, embedded, cut into sections of 60 nm thickness and mounted onto copper grids. TEM images were acquired at 80 keV using a JEM 1010 microscope (JEOL, Tokyo, Japan) with an AMT NanoSprint500 5 Megapixel (AMT, Woburn (Mass.), USA).

Scanning electron microscopy (SEM) Samples were freeze-dried shortly before the acquisition of SEM images using a Quanta 250 (FEI, Hillsboro, OR) at near atmospheric pressure, with a gaseous secondary electron detector.

Fourier transform infra-red (FT-IR) 5 μL samples were ground with 100 mg KBr and pressed into pellet; the transmission spectrum of Se-PCPP hydrogel was collected on a JASCO FT/IR-480 PLUS.

Inductively coupled plasma optical emission spectroscopy (ICP-OES) Gold and phosphorous concentrations in Se-PCPP hydrogels were determined using ICP-OES (Spectro Genesis ICP). The samples were prepared by dissolving 10 μl of sample stock solution in 1 mL of aqua regia and making the final volume to 6 mL with DI water.

Vial inversion The gel characteristics of the Se-PCPP hydrogel were initially assessed by performing the vial inversion method. Briefly, the samples were transferred to vials and allowed to stand reversed for one hour. All mixtures that remained unchanged and without dropping were considered as having the characteristics of a gel.

Rheology The hydrogels were sonicated for 30 minutes in an ultrasound bath before loading onto the rheometer. The rheometer experiments were conducted using a parallel plate geometry, a gap size of 100 μm, and the following measurements were carried out at 25° C.: frequency sweep (0.01-100 Hz, 0.2% strain), time sweep (0.2% strain, 10 Hz), strain sweep (0.01-500% strain, 10 Hz), continuous flow (shear rates from 0 to 50 s$^{-1}$ over 2 min 30 s), and cyclic strain (low: 0.2% strain, high: 500% strain, 10 Hz).

Injection force The hydrogels were sonicated for 30 minutes in an ultrasound bath before loading 50 μL of the sample into a 1 mL syringe assembled with a 25-gauge needle. The syringe was placed into an Instron 5848 microtester (Norwood, MA) and the load cell was placed in close vicinity to the plunger before initiating the experiment with a flow rate of 2 mL/hr while recording the maximum force applied during hydrogel extrusion over time. Testing was carried out in air and repeated 6 times.

X-ray irradiation The radiation dose delivered to the sample is quantified in gray (Gy) with the relation of 1 Gy=1 J/kg. The X-ray irradiation was performed on an X-RAD 320ix irradiator (PXi, North Branford, CT) operated at 320 kV, 12.5 mA, focal spot of 8 mm$^2$ and with an aluminum filter of 2 mm delivering a dosage rate of 2.65 Gy/minute. In brief, the Se-PCPP hydrogel was sampled into 1 mL tube and placed in the irradiator chamber for the desired time depending onto the X-ray dose to be delivered.

Hydrogels Degradation and Cargo Release Experiments

Se-PCPP hydrogel ([Au]=0.2 mg/mL) was suspended into 1 mL of freshly prepared PBS/10 FBS in micro-centrifuge tubes and centrifuged at 4 k rpm for 8 minutes. Samples were irradiated with the desired X-ray dose and incubated at 37° C. for the overall experiment time. At the desired time point, samples were vortexed, centrifuged at 4000 rpm for 8 minutes and the supernatant was gently collected for quantification of the released cargo by ICP-OES or UV-vis spectroscopy. 1 mL of freshly prepared incubation medium was rapidly added to each sample, all were incubated at 37° C. until the next time point.

Cell Culture

HepG2, Renca, SVEC4-10, U251 and NS039 cell lines were cultured according to the supplier's instructions, and all experiments were performed in triplicate.

LIVE/DEAD assay was performed to assess the biocompatibility of Se-PCPP hydrogel. Cells were plated in 6 wells plate at a density of 100 k cells per well. After a 24-hour incubation, the cells were treated with Se-PCPP hydrogel at concentrations of 0, 0.125, 0.25 and 0.5 mg/mL. After 8 hours of incubation at 37° C., 5% CO$_2$ for 24 hours, the cells were washed twice with DBPS and incubated for another 20 min with 400 μL of LIVE/DEAD cocktail (0.025% stock Calcein and 0.1% stock Ethidium-1 homodimer in DPBS). Three images of four different areas of each well were acquired (excitation/emission filter pairs, 495/515 nm, and 528/617 nm, for Calcein or Ethidium Homodimer-1, respectively). Cell counts for each dye in each image was performed using a custom MATLAB code, and the ratio of dead to living cells normalized to control was calculated as the viability measurement.

MTS assay was performed to assess the cytotoxicity of the drug released from the hydrogel on GBM cells U251 and NS039 by adaptation of previously reported procedures. Cells were plated in 96 wells plate at a density of 5 k cells per well and incubated at 37° C., 5% CO$_2$ for 24 hours. In the meantime, the drug loaded hydrogel was incubated in cell medium, at 37° C., for 24 hours post X-ray irradiation (0 Gy for drug elution or 60 Gy for X-ray triggered drug release). Then, the drug containing supernatants were used to treat GBM cells for 48 hours at 37° C., 5% CO$_2$. Cells were finally rinsed with PBS once, and incubated with MTS solution (20 μL stock solution in 100 μL cell medium) 30 minutes prior absorbance measurement at 490 nm with a plate reader (Synergy H1, BioTek, VT).

Computed Tomography (CT) Phantom Imaging

Samples of different Au/P ratio were prepared into 250 μL vial tubes and secured in a plastic rack. A MiLabs μ-CT was operated at a tube voltage of 55 kV with tube current of 190 μA and exposure of 75 ms to acquire the CT images. Slices of 100 μm thickness with an increment of 0.1 mm were reconstructed using the algorithm provided by the manufacturer. Image analysis was performed using OsiriX (v.3.7.1 64-bit software). A circular ROI was drawn on the coronal view of each tube and the mean attenuation value for the ROI of five slices per tube was recorded and normalized to the value of the non-loaded Se-PCPP hydrogel. The reported attenuation value for each concentration correspond to the average of three samples of that same concentration.

In Vivo Rodent Model of Xenografted GBM

NS039 cells were resuspended in PBS, and then $1.0 \times 10^6$ cells were subcutaneously implanted on the right flank of athymic nude mice and allowed to grow to a volume of approximately 100 mm$^3$. Daily monitoring of the mice was performed, ensuring the cage cleanliness, adequate water and food as well as good mouse activity. Both tumor growth and mice weight were measured every other day. Tumor length and width were measured with an electronic caliper and the volume was determined as V=(length*width$^2$)/2. Tumors were allowed to grow up to V=15 cm$^3$ as per IACUC standards, after which animals were sacrificed.

Intra-Tumoral Injection

All mice were first anesthetized with isoflurane, then were administered an intra-tumoral injection of 50 µL of treatment as follows: Group 1: untreated (n=5), Group 2: radiotherapy (n=6), Group 3 radiotherapy+hydrogel (n=6), Group 4 hydrogel+drug (n=6), Group 5 hydrogel+drug+radiotherapy (n=6). Hydrogel concentration [Au]=8 mg/mL; Drug concentration [QS]=0.5 mg/mL; radiotherapy dose XR=10 Gy.

In Vivo CT Imaging and Radiotherapy

In vivo CT The mice were first anesthetized with isoflurane, then CT images were acquired on a SARRP (Gulmay Medical, Inc, Camberley, United Kingdom) cone-beam CT at 50 kVp, 0.5 mA, and 1440 projections were used to reconstruct the images using with the algorithm provided by the manufacturer. Image analysis was performed using OsiriX (v.3.7.1 64-bit software). ROI was measured using the ROI segmentation tool to delineate the hydrogel from surrounding tissues, the hydrogel was reconstructed in 3D volume and ROI was measured as the ROI values normalized to the muscle, and summed across the hydrogel.

In vivo radiotherapy 24 hours post-injection of the hydrogel, the mice (groups 3, 4 and 5) were anesthetized with isoflurane and were administered an X-ray dose of 10 Gy focused onto the tumor, delivered with a SARRP (Gulmay Medical, Inc, Camberley, United Kingdom), through a 17 mm diameter collimator mounted with a 0.15 mm copper filter and at a distance of 35 cm separating the mouse to the source.

Survival Analysis of Xenografted Mice

The survival time until the mice reached the maximum tumor growth as per IACUC standards, was calculated from the date of cell implantation (day −20). Mice were sacrificed if showing signs of distress, including excessive weight loss (>20%), lethargy, tumor metastasis, in accordance with IACUC standards.

Organs Harvesting and Ex Vivo Investigations

The mice were first euthanized with $CO_2$, followed by cervical dislocation as per IACUC recommendations. Then the abdominal cavity was opened to perform left ventricle perfusion with 20 mL of cold PBS and finally, dissection was performed to harvest the major organs (heart, lungs, liver, spleen, kidneys) and the tumor. All organs were washed with cold PBS, transferred to 10% buffered formalin solution, cut to small pieces keeping aside one sample for histopathological investigation and the remaining for gold quantification.

Ex vivo biodistribution of gold Organ pieces were digested by 1 mL $HNO_3$ for 17 hours at 75° C. and one more hour at 75° C. with 250 µL HCl. All solutions were diluted with DI $H_2O$ to a final volume of 6 mL, centrifuged (1000 rpm, 10 min) and filtered prior gold quantification using ICP-OES.

Histopathological tissue analysis Each organ slice was fixed in 10% buffered formalin solution and kept at −4° C. until further processing with sequential dehydration in increasing concentrations of ethanol and storage at −20° C. Finally, organ slices were embedded in paraffin, sectioned, stained with hematoxylin and eosin dyes (H&E) and analyzed with a slide scanner Aperio CS-O (Leica Biosystems).

Statistical Analysis

Each experiment was performed at least in three replicates, unless stated otherwise. A one-way ANOVA test was performed on the Excel software for statistical analysis, and the data were considered non-statistically significant for $p > 0.05$.

Results

Cell Based Death Receptor Uncovers Epigenetic Agents

Figure 3A:
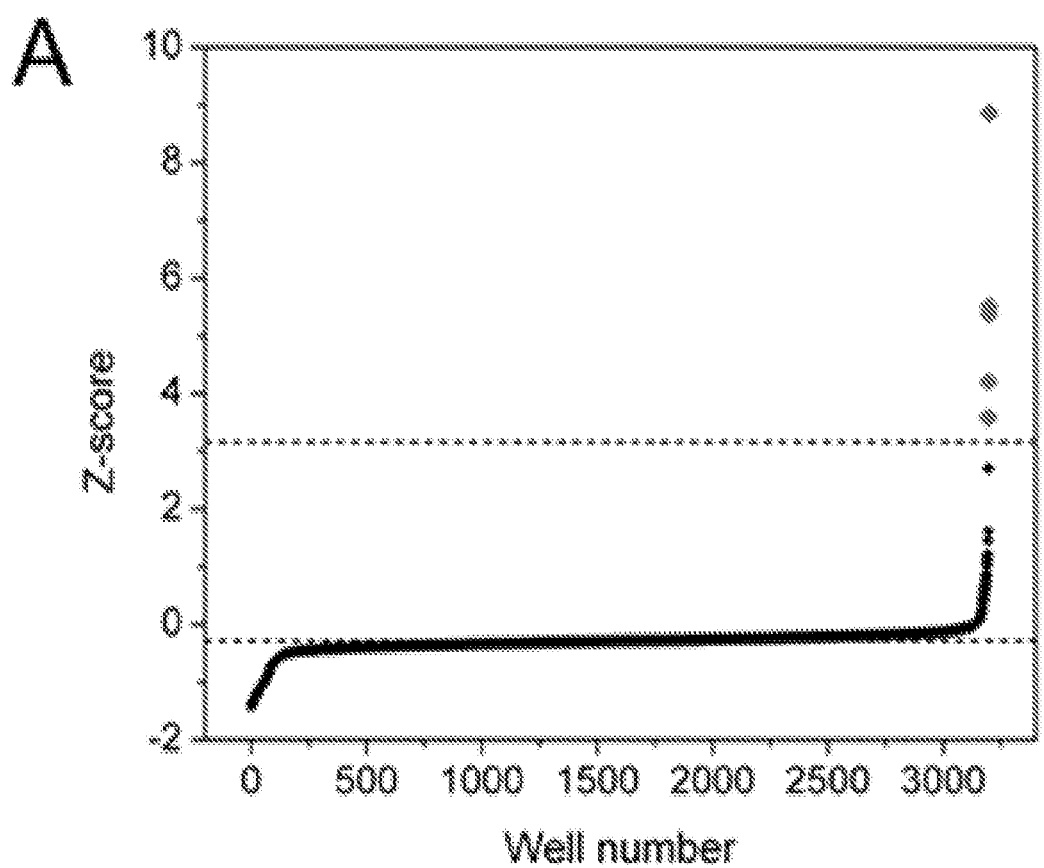
FIGS. 3A to 3D illustrate identification of anti-glioblastoma drug candidates.
Figure 3B:
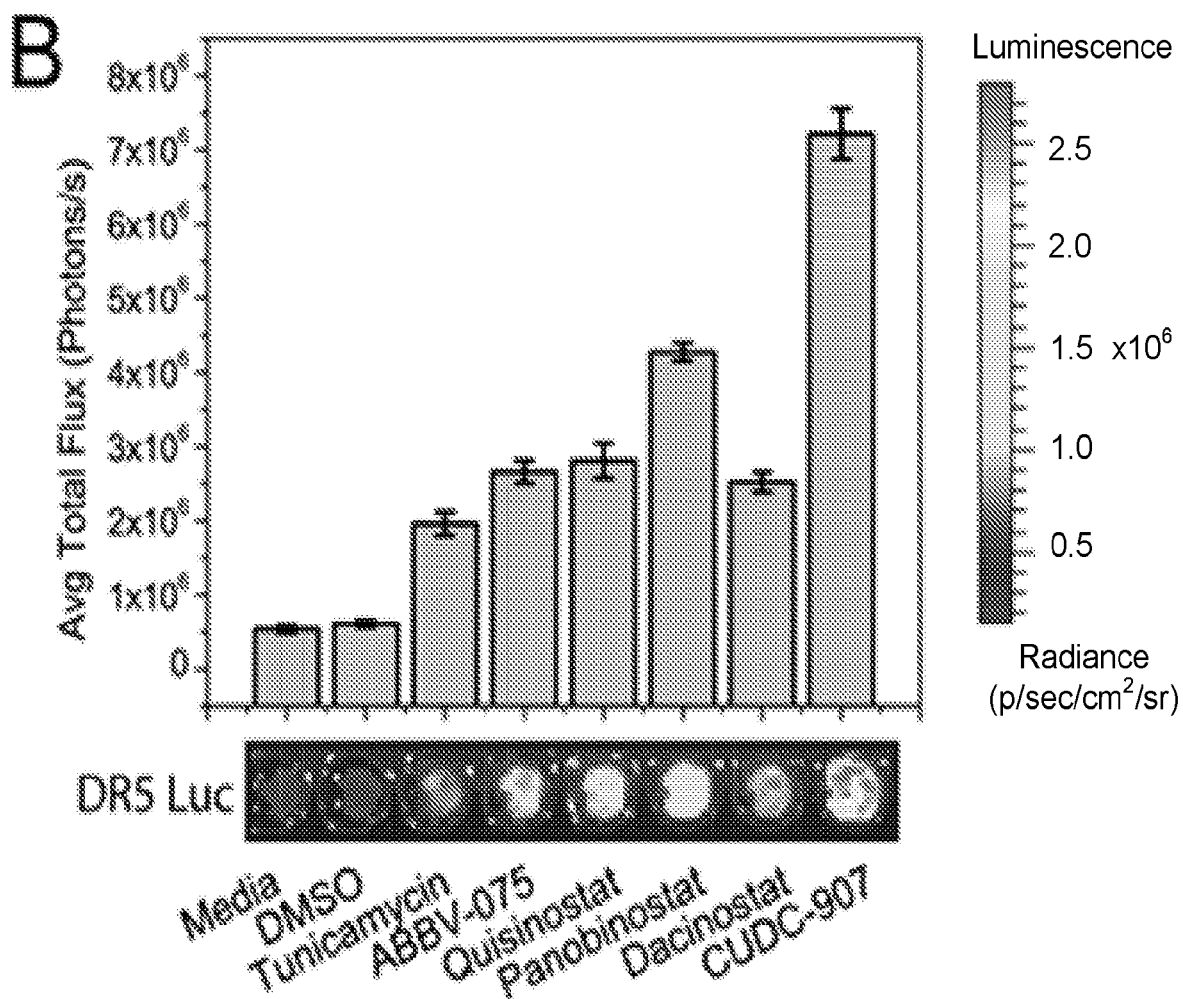
Figure 3C:
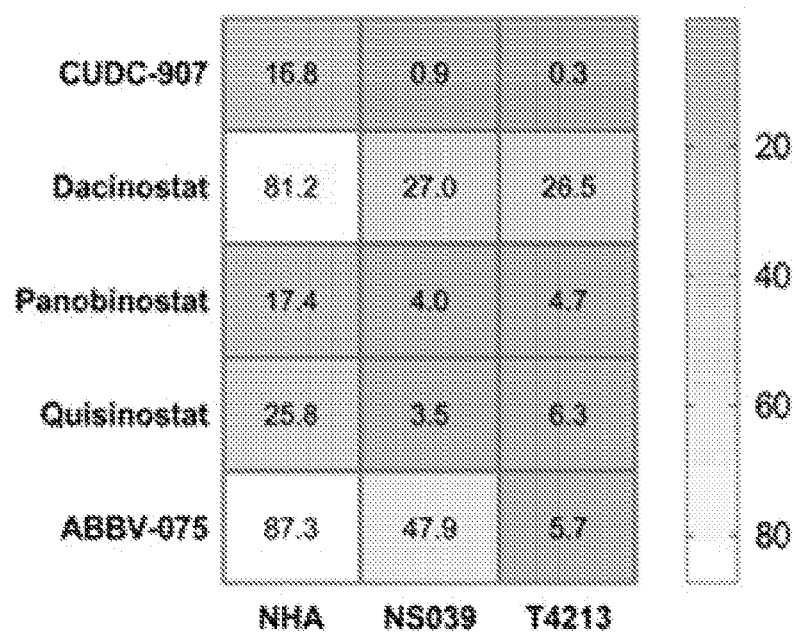
Figures 9A, 9B:
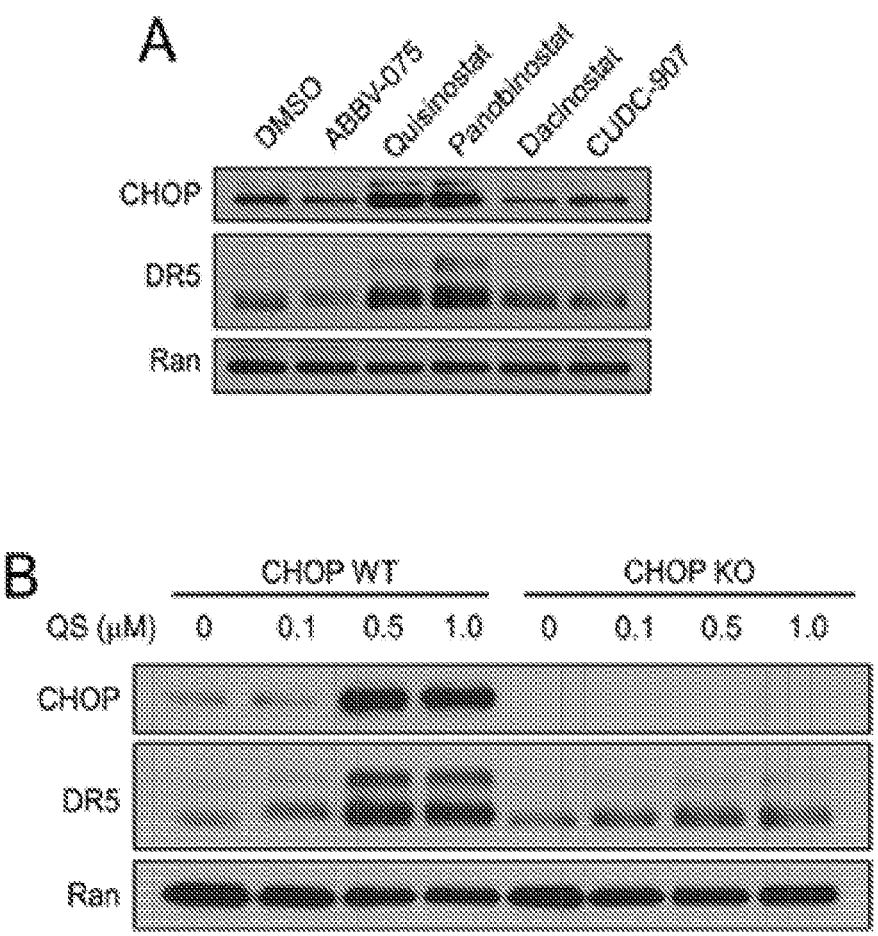
FIGS. 9A to 9B depicts results from Western blotting for the effects of the lead compounds on CHOP and DR5 (FIG. 9A), and dose dependent effects of quisinostat on CHOP and DR5 (FIG. 9B).

The cell-based death receptor assay was used to screen over three thousand compounds at 100 nM uncovering five promising hits that produced a bioluminescent signal that was greater than our positive control Tunicamycin (FIG. 3A), i.e. Quisinostat, Panobinostat, CUDC-907, ABBV-075 and Dacinostat. Our assay was able to reliably identify potential hits as indicated by a Z'-factor of 0.68. Quisinostat, Panobinostat, and CUDC-90, that share a common mechanism of epigenetic modification, led to single digit nanomolar IC50 values in both NS039 and T4213 (FIG. 3B). The therapeutic window for each of these compounds was defined as the ratio of IC50s between drug treated normal human astrocytes (NHA) and either NS039 or T4213. Quisinostat was selected over CUDC-907 and Panobinostat as a promising hit due to its favorable therapeutic window in both NS039 and T4213, and its ability to generate CHOP dependent DR5 expression at nanomolar concentrations (FIGS. 9A, 9B).

Figure 1A:
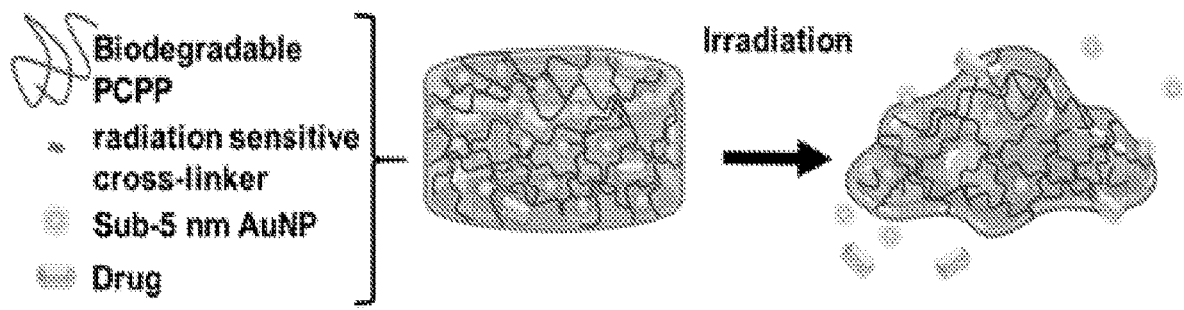
FIG. 1A depicts an illustration of X-ray triggered degradation of the hydrogel.
Figure 1B:
FIG. 1B illustrates an exemplary X-ray-sensitive cross-linker within the hydrogel: selenocystamine.
Figure 1C:
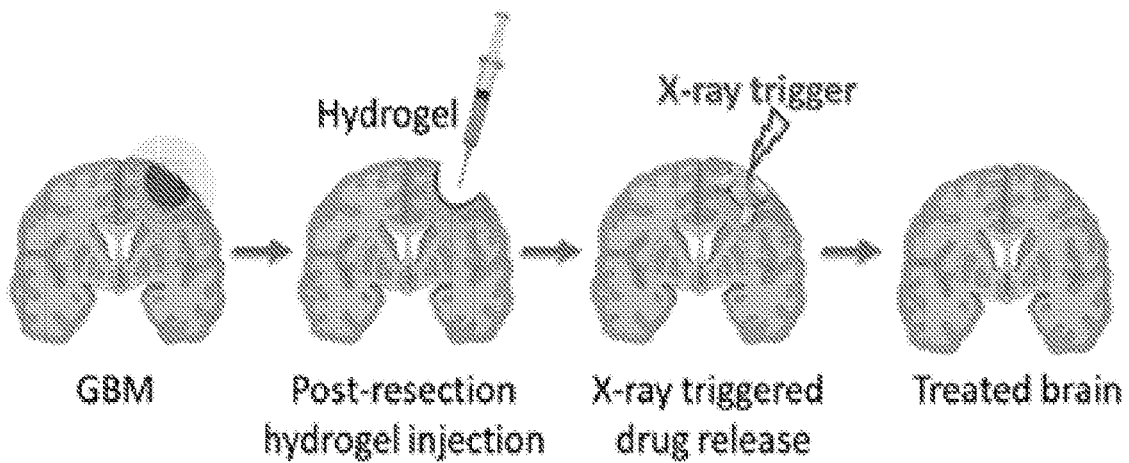
FIG. 1C illustrates an exemplary use of injectable hydrogel for the treatment of glioblastoma (GBM), according to an embodiment of the invention.
Figure 2A:
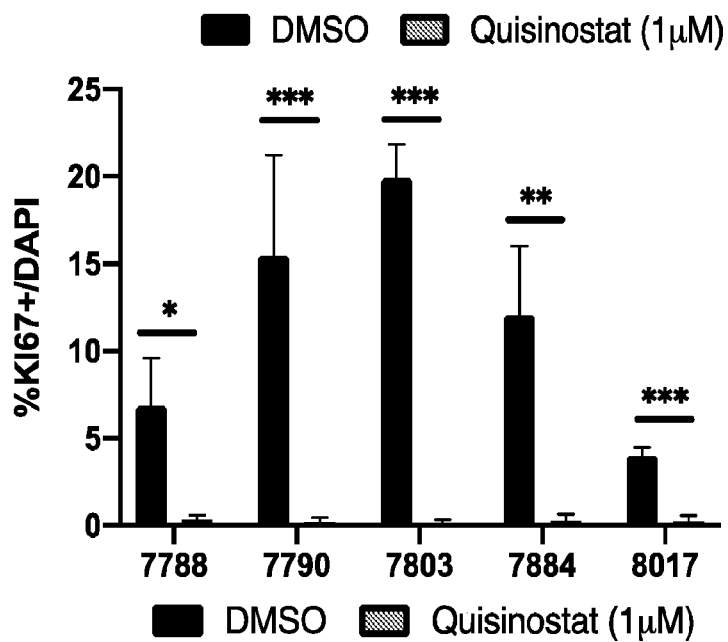
FIGS. 2A to 2D depict results demonstrating that GBM stem cell and organoid viability is reduced following Quisinostat treatment.
Figure 2B:
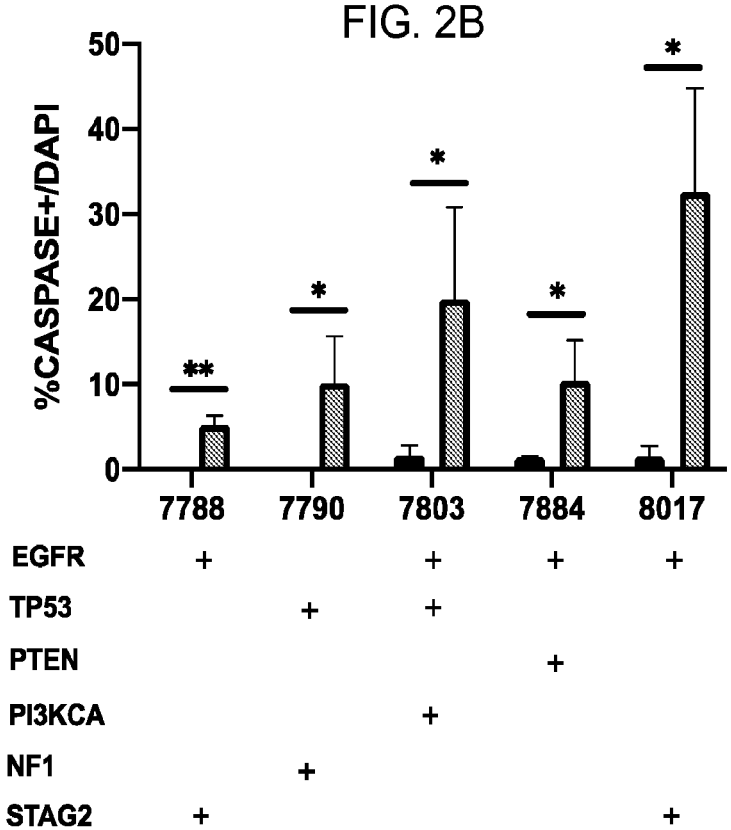
Figure 2C:
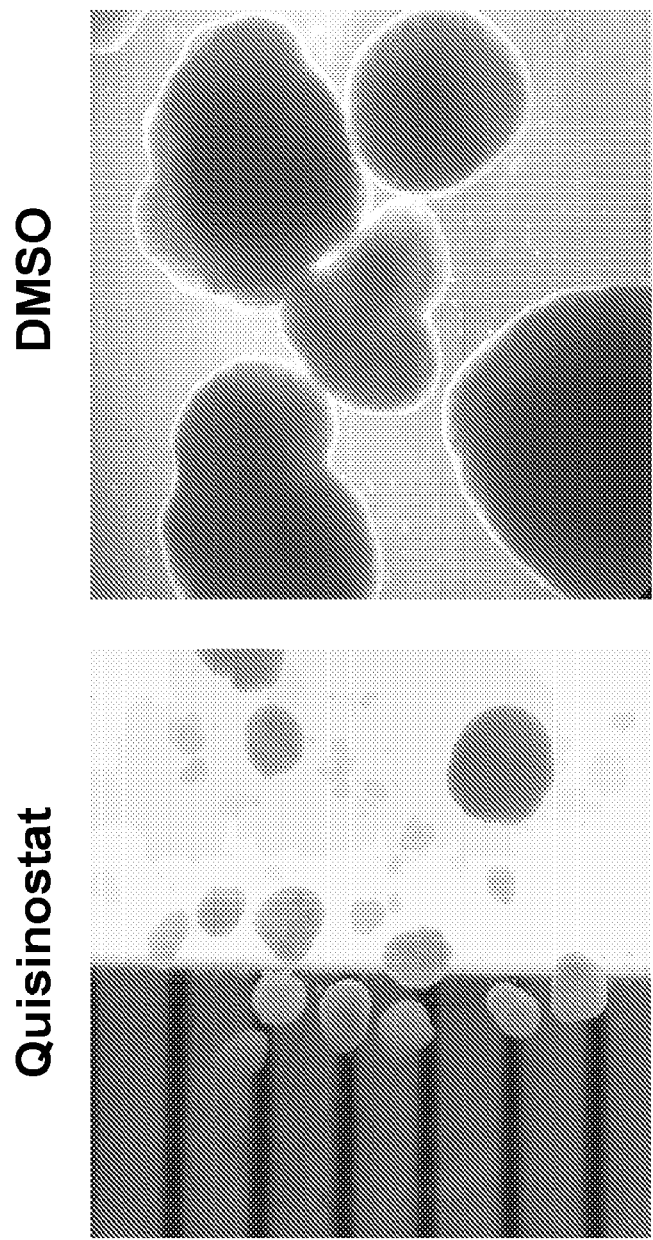
Figure 2D:
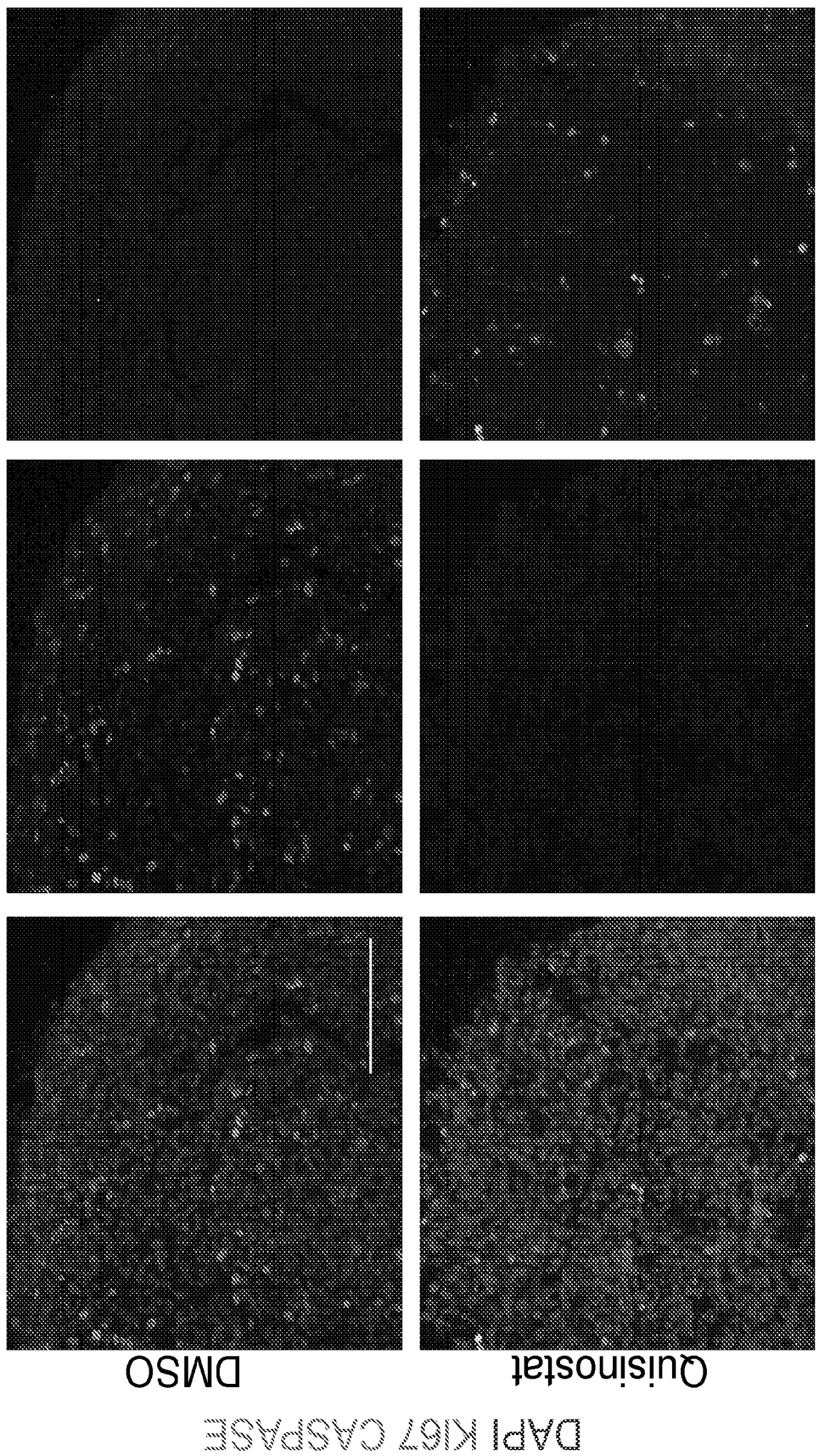
Figure 10A:
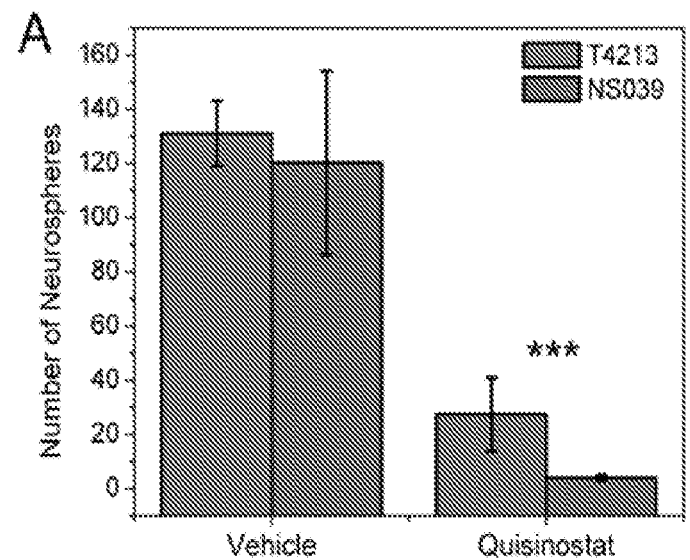
FIGS. 10A to 10B depicts the effect of quisinostat on glioblastoma neurosphere and organoid formation. Comparison of the effect of either vehicle or 1.0 µM quisinostat treatment on neurospheres by analysis of numbers of neurospheres formed from the cells is shown in FIG. 10A, and representative images of neurospheres after treatment are shown in FIG. 10B.
Figure 10B:
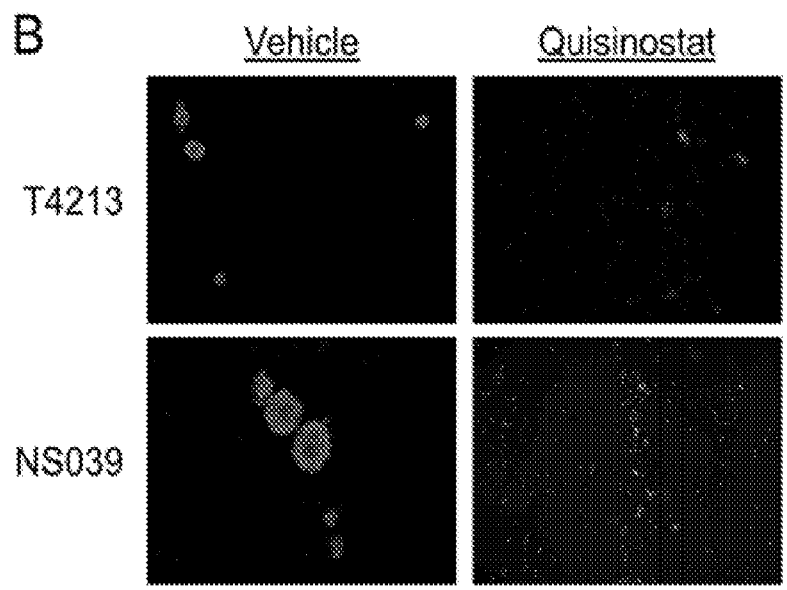

GBM Stem Cell and Organoid Viability is Reduced Following Quisinostat Treatment Incubation of T4213 and NS039 cells with 1.0 µM Quisinostat significantly reduced neurosphere formation from 120-130 neurospheres per well to 4-27 neurospheres per well at twelve days (FIG. 10A, p<0.05). Hoechst staining reveals intact neurospheres following incubation of T4213 and NS039 cells with 0.1% DMSO (FIG. 10B). However, Quisinostat incubation resulted in a shrunken and fragmented cell morphology accompanied by a loss of sphere formation and integrity (FIG. 2C). Patient-derived glioblastoma organoids (GBOs) noticeably shrink following treatment with 1.0 µM Quisinostat at seven days. Caspase staining is increased and Ki67 staining is decreased following Quisinostat treatment in five distinct GBO lines harboring a variety oncogenic mutations (FIGS. 2A and 2B)

GSC Viability is Reduced Following In-Vivo Treatment with Quisinostat

Figure 3D:
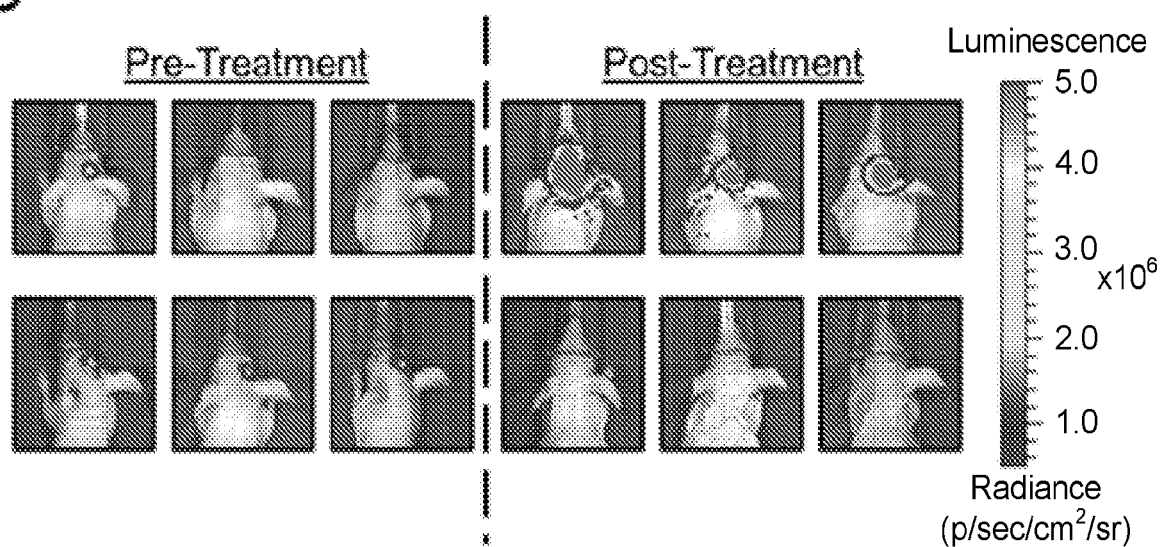
Figure 11A:
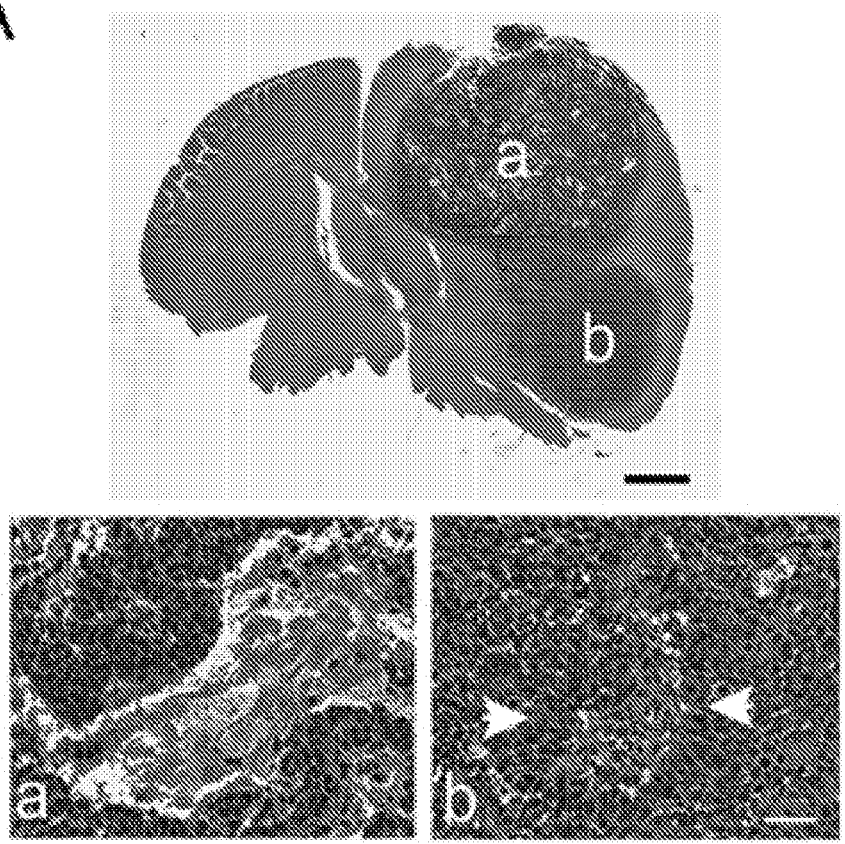
FIG. 11A depicts representative photos of the aggressive lesion due to T4213 implantation after H&E staining. The corresponding BLI signal increase in the implants over time is shown in FIG. 11B.
Figure 11B:
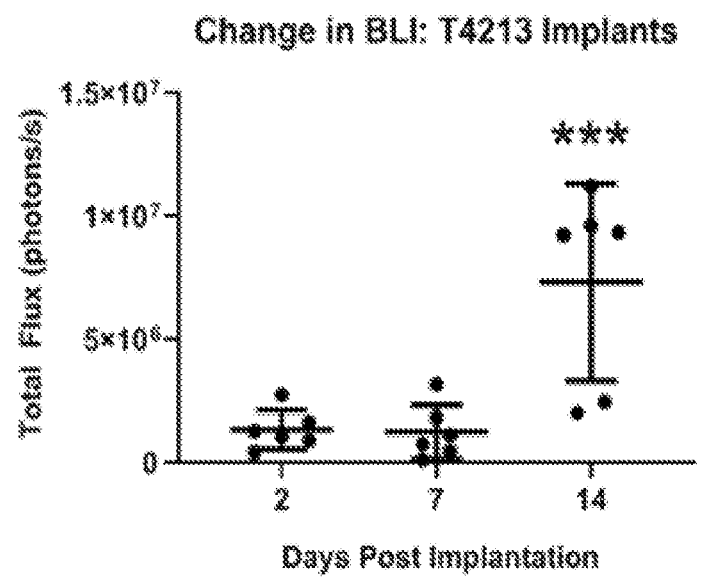
FIG. 11C depicts a timeline of the in vivo protocol for cell implantation and lesion follow up by BLI.
FIG. 11D depicts a comparison of the in vivo effects of either vehicle of quisinostat on the lesion by BLI.
Figure 11C:
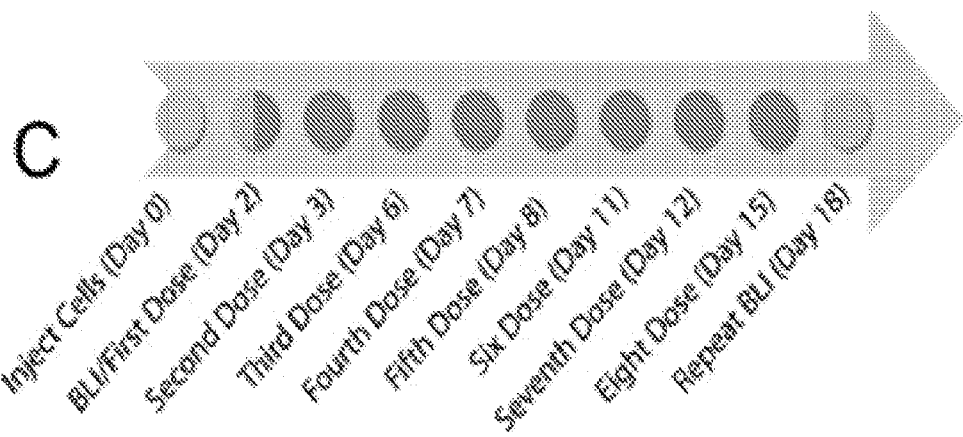
Figure 11D:
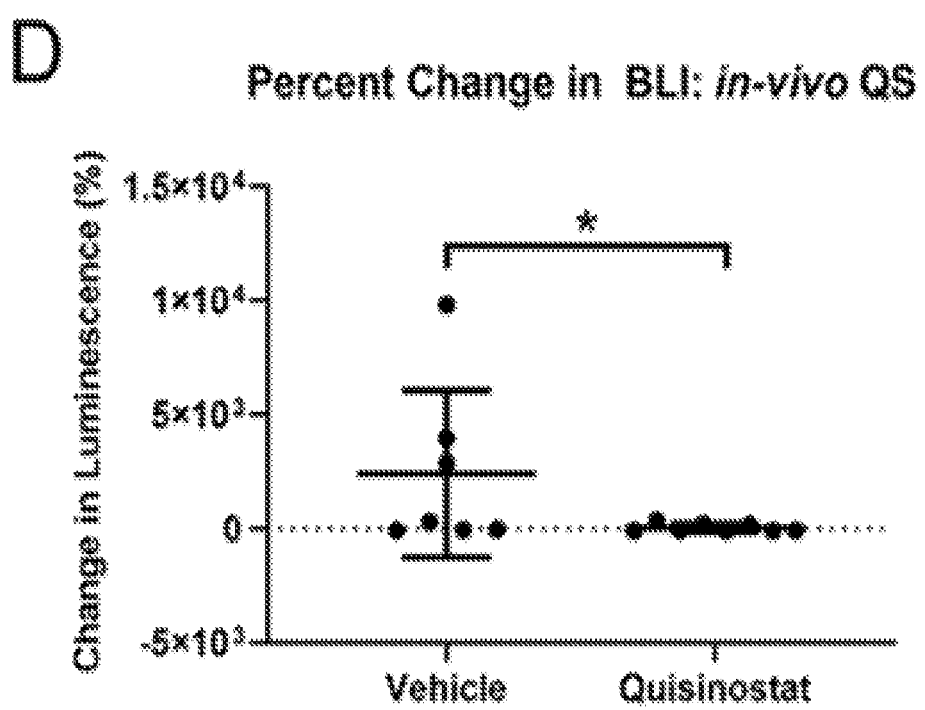

Orthotopic implantation of T4213 produces a tumor that mimics features of aggressive GBM, such as hemorrhagic foci and pseudopalisading necrosis (FIG. 11A). Early initiation of once daily Quisinostat at 10 mg/kg with interspersed breaks produced a significant reduction in tumor bioluminescence seventy-two hours following the last treatment (FIGS. 11B, 11C). Mice treated with Quisinostat demonstrated a noticeable decrease in tumor bioluminescence following treatment with intraperitoneal Quisinostat (FIG. 3D). However, tumor bioluminescence either remained stable or increased dramatically in vehicle treated mice (FIGS. 3D and 11D). These findings highlighted the potential for administration of Quisinostat to reduce the viability of GBM stem cell populations. However, it was found that systemic administration of quisinostat resulted in reduction of mouse body weight, motivating development of a localized delivery system for this drug.

Figures 4A, 4B, 4C:
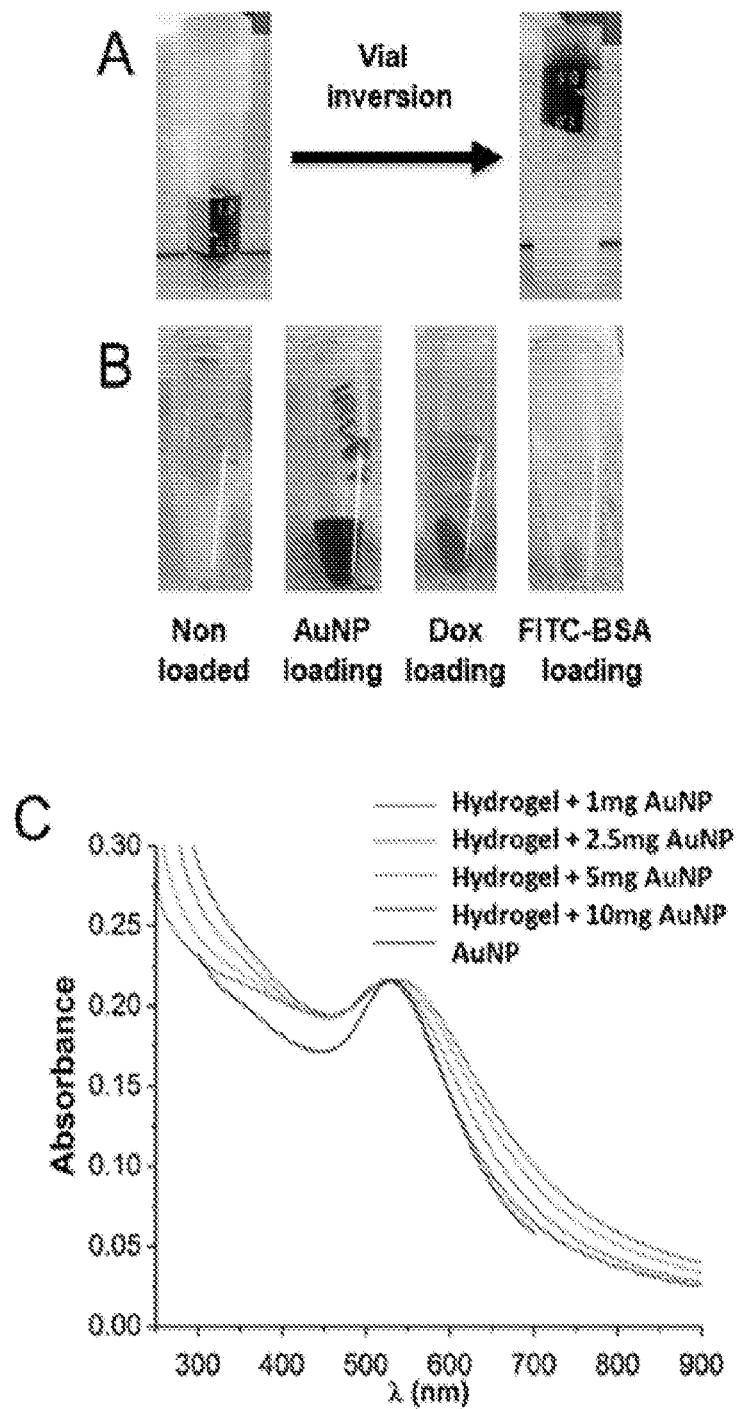
FIGS. 4A to 4E depict loading of various cargoes and physico-chemical characterization of the Se-PCPP hydrogel.
Figure 4D:
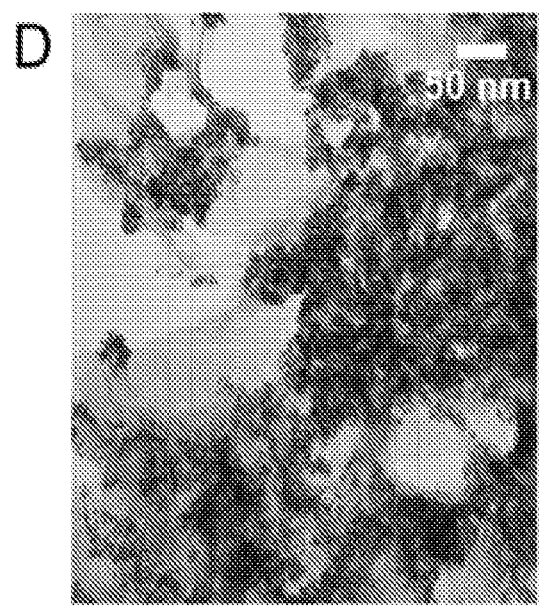
Figure 4E:
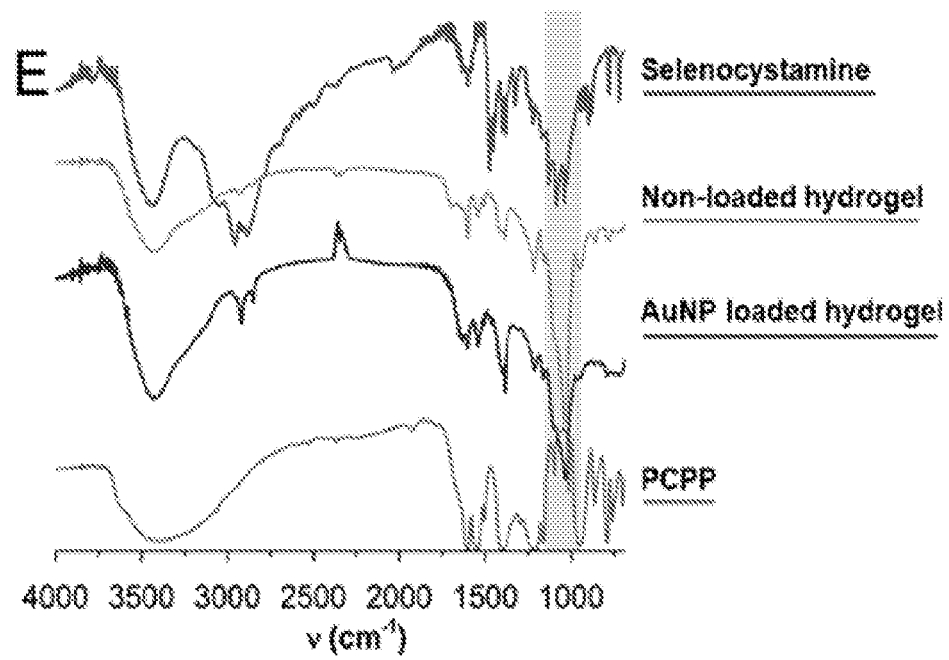
Figure 12A:
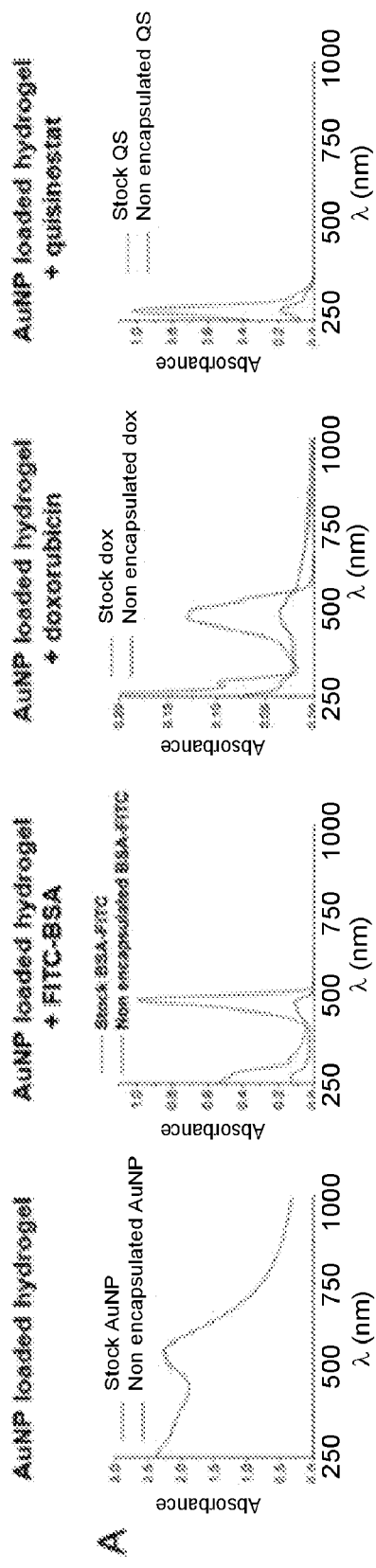
FIGS. 12A to 12E depict structural characterizations of the Se-PCPP hydrogel with various loadings. Characterization of Se-PCPP hydrogel with various loadings, AuNP, FITC-BSA, doxorubicin and quisinostat respectively from left to right.
Figures 12B, 12C, 12D:
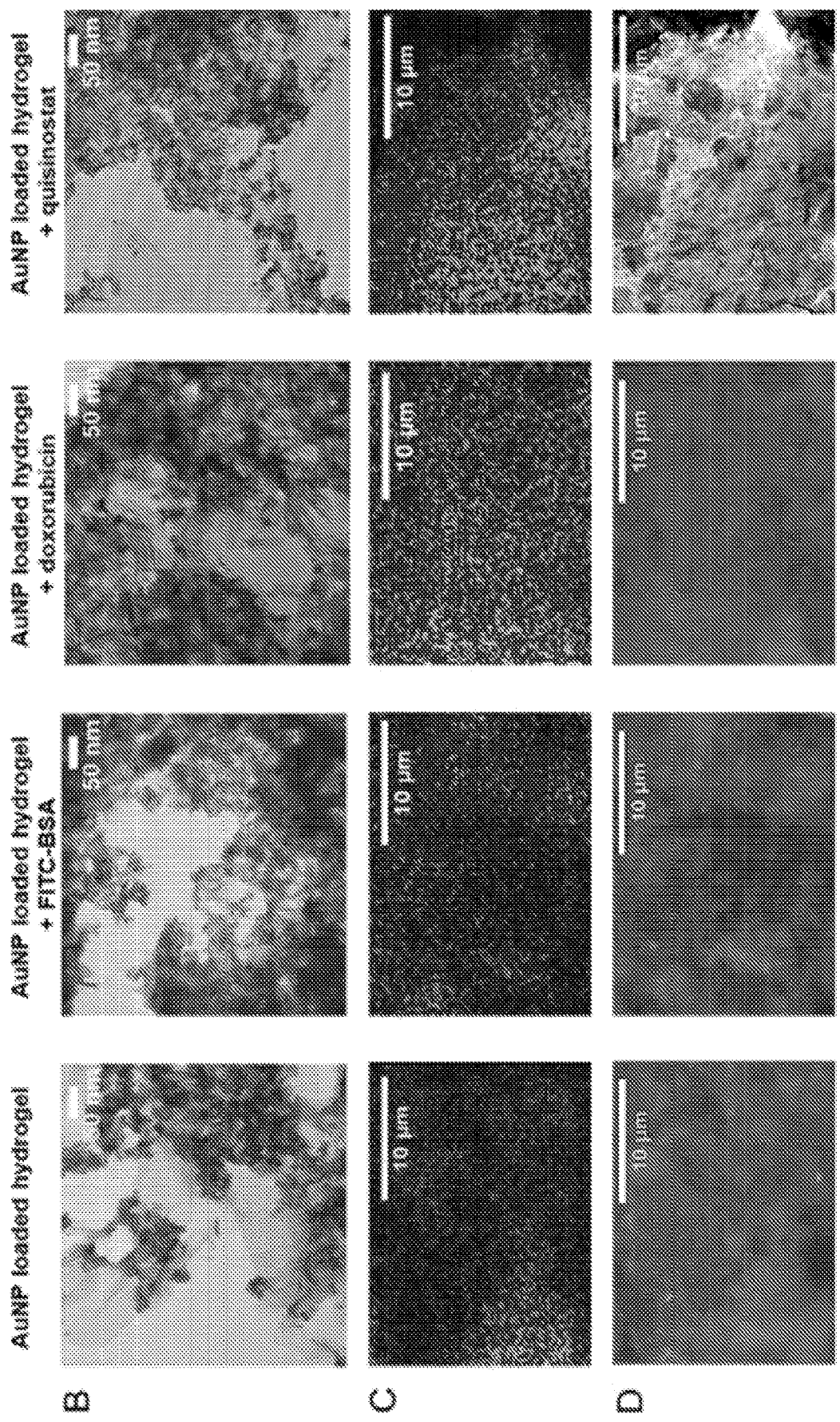
Figure 12E:
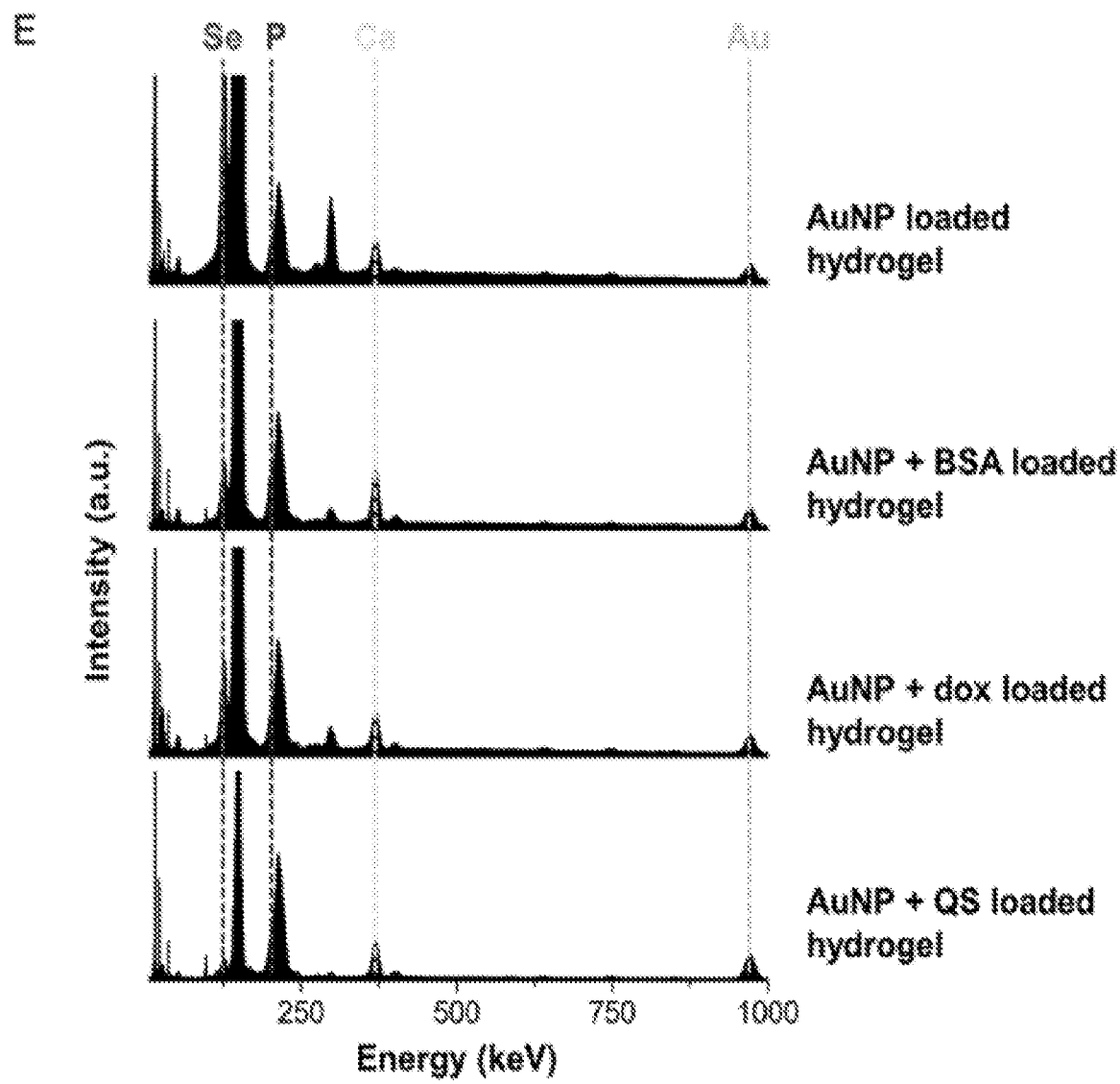

Synthesis, Characterization and Contrast Enhancement in CT of the Se-PCPP Hydrogel We describe herein a hydrogel formulation that we termed Se-PCPP, that can be obtained by physical mixing of the PCPP polymer with selenocystamine cross-linker, prior to secondary cross-linking with calcium chloride. This hydrogel formulation can be adapted to allow the loading of large amounts of radiopaque AuNP as well as other payloads, allowing 99% encapsulation efficiency at a loading ratio of 5 mg AuNP to 1 mg of PCPP. Se-PCPP was found to maintain its characteristics as a hydrogel by vial inversion when loaded with AuNP (FIG. 4A). In view of using this hydrogel as a drug delivery platform, we tested the capability of this hydrogel to load alternative payloads that possess different physico-chemical properties and molecular weights, namely the selected anticancer drug quisinostat, as well as doxorubicin or FITC-BSA (FIG. 4B). High loading efficiencies were found by UV-vis spectroscopy irrespective of the hydrophobicity or molecular weight of the payload, i.e. 81% for quisinostat, 74% for doxorubicin and 91% for FITC-BSA. The surface plasmon resonance of AuNP encapsulated in the hydrogel was found to undergo a slight bathochromic shift and broadening in UV-vis spectroscopy as the loading increased (FIG. 4C), and TEM on a dry sample of Se-PCPP shows the dispersion of AuNP throughout the hydrogel (FIG. 4D). The chemical composition of the hydrogel, comprising both the PCPP polymer and selenocystamine cross-linker, was confirmed by FT-IR (FIG. 4E). Homogeneous distribution of the AuNP payload in the bulk hydrogel was observed by TEM, elemental mapping, SEM and EDX, and was found unchanged after loading with other payloads, i.e. small molecules or FITC-BSA (FIG. 12).

Figures 13A, 13B:
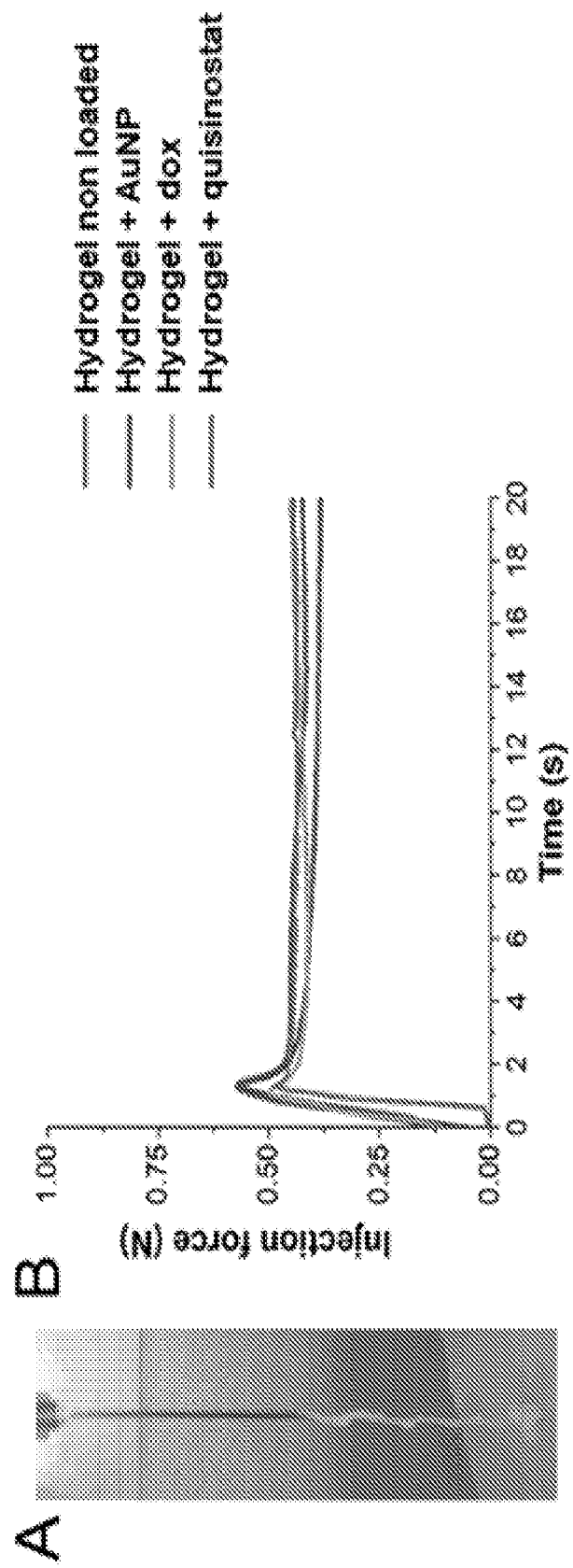
FIGS. 13A to 13D depicts mechanical tests on the Se-PCPP hydrogel and influence of the various loadings.
Figure 13C:
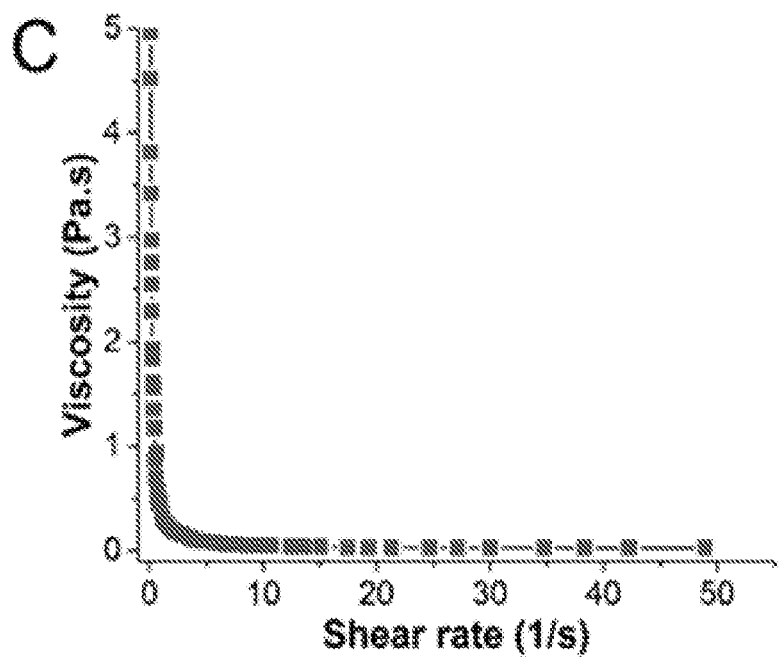
Figure 13D:
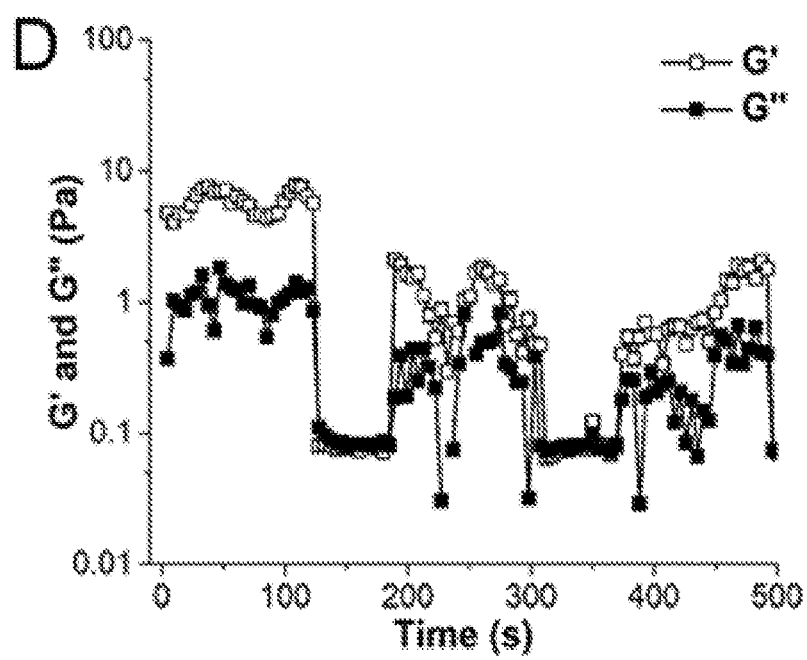

Injectability and self-healing of the hydrogel are appealing properties to facilitate their administration by the surgeon following craniotomy and main tumor resection. The Se-PCPP hydrogel was found to be easily injectable and injection forces were not affected by the loading with various payloads (FIGS. 13A and 13B). Moreover, the mechanical properties of the hydrogel were evaluated by rheological measurements, showing shear-thinning behavior with a decrease in the viscosity as the shear rate was increased. Moreover, the hydrogel showed an elastic behavior at low strains that decreased with increased strain, as well as partial self-healing properties upon a reduction of strain, likely due to the reversible ionic interactions in the hydrogel (FIGS. 13C and 13D). Furthermore, AuNP produce strong contrast enhancement in CT, hence their loading in the Se-PCPP hydrogel made it opaque to radiation and trackable by CT. The CT contrast enhancement of Se-PCPP was found to linearly correlate with the loading of AuNP, thus allowing the indirect monitoring of its degradation in a non-invasive manner and without a depth penetration limit (FIG. 14).

Figure 14A:
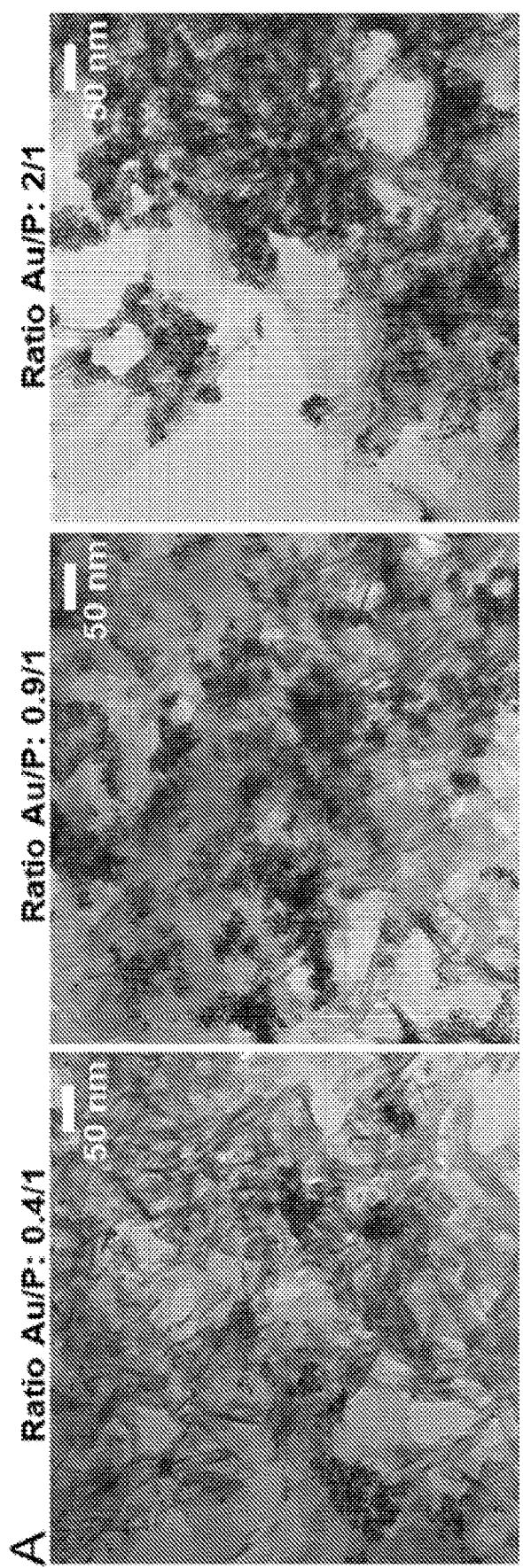
FIGS. 14A to 14D illustrate the increasing of the loading of AuNP in the Se-PCPP hydrogel for contrast enhancement in CT.
Figures 14B, 14C, 14D:
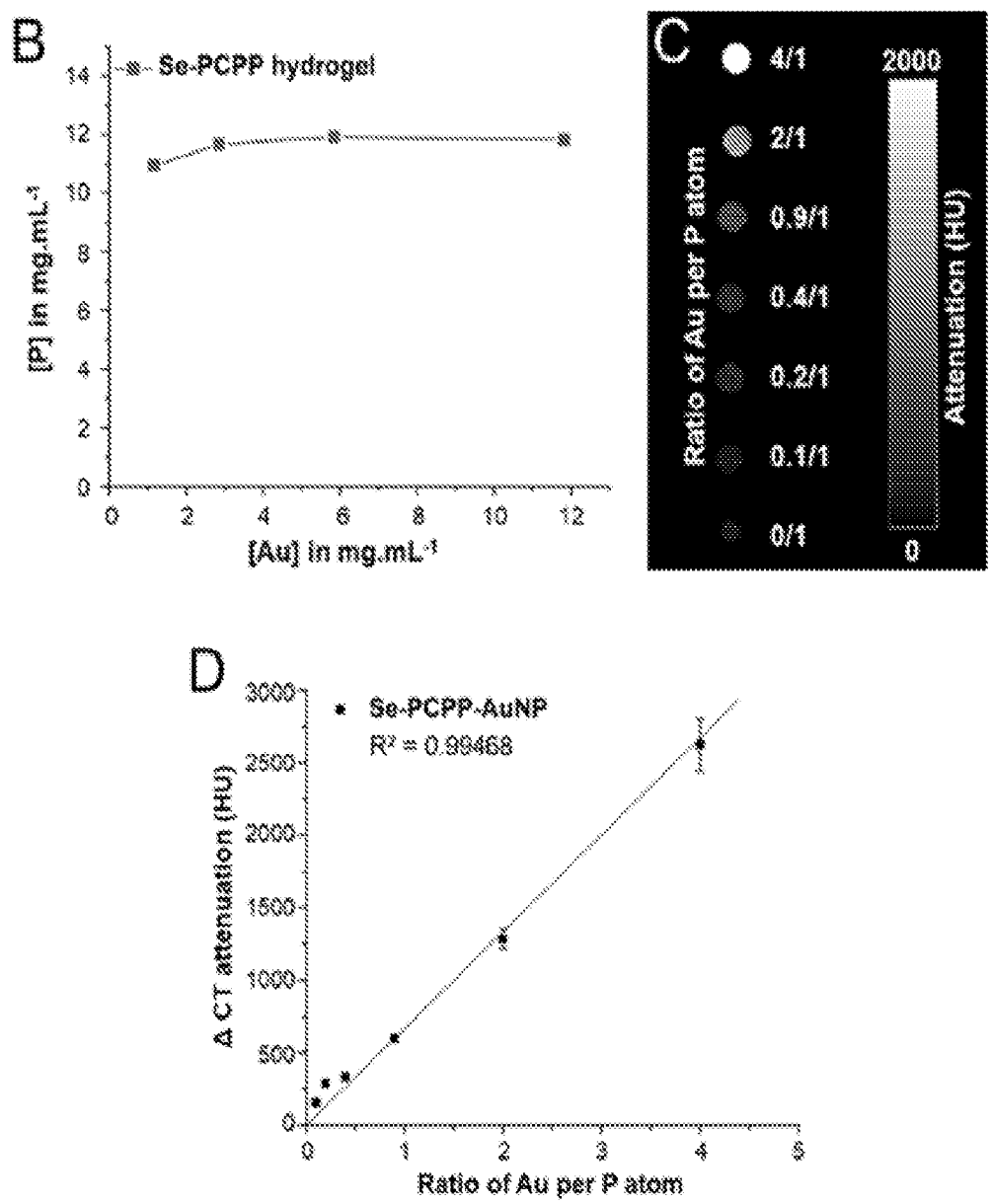

Radiation Triggered Degradation and Payload Release from the Se-PCPP Hydrogel Enhancing drug delivery as a response to an external trigger that has no depth penetration limit is an appealing feature for personalized medicine. Here, we chose to trigger enhanced drug release on demand, in response to radiotherapy. The degradability of Se-PCPP hydrogel by radiation was investigated by comparing the release profile of AuNP and other payloads after administration of either a mock dose corresponding to 0 Gy, or a single dose of 60 Gy. The release of AuNP was found to be three times greater after radiation when compared to the drug elution observed after mock irradiation (FIG. 5A). On the other hand, irradiation with low radiation doses below 5 Gy did not significantly affect the hydrogel, and 10 Gy had a moderate effect on the irradiation triggered degradation (FIG. 14A). Of note, the loading of other payloads in addition to AuNP did not affect their release rate after irradiation (FIG. 14B). Similarly, irradiation of the hydrogel was found to significantly enhance the delivery of the encapsulated drugs compared to simple drug elution (FIG. 14C), with up to 93% of drug being released 7 days after treatment (FIG. 5B). Of note, the delivery profile of FITC-BSA is slower than both quisinostat and doxorubicin, which is likely due to BSA's markedly higher molecular weight. Additionally, the stability of the hydrogel toward storage and its degradability by radiation were evaluated based on their mechanical properties by measurement of their injection force (FIG. 14D). The injection force of Se-PCPP hydrogel was unchanged after 7 days of incubation at 37° C., which suggests that its hydrogel-like properties were maintained. Contrastingly, hydrogel irradiation by 60 Gy followed by 7 days incubation at 37° C. yielded an irregular curve, thus suggesting the partial loss of viscosity and degradation of the hydrogel as a consequence of irradiation.

Additionally, to confirm the radiation enhanced drug delivery, the effects of drug released from irradiated or non-irradiated hydrogel was assessed in vitro on two GBM cell lines (U251 and NS039). Hence, the drug loaded hydrogel was irradiated with 0 Gy or 60 Gy and incubated with cell medium for 24 hours to allow the drug release by simple drug elution or radiation triggered drug delivery, respectively. Then, U251 and NS039 cells were further incubated with these drug-containing cell media before evaluation of their cell viability (FIG. 5C). While a moderate decrease of the cell viability is observed due to the drug elution from the hydrogel in the absence of trigger, a significant decrease in cell viability down to 27% is observed in the context of radiation enhanced delivery of quisinostat, thus supporting the enhanced drug delivery profile triggered by radiation.

Figures 15A, 15B:
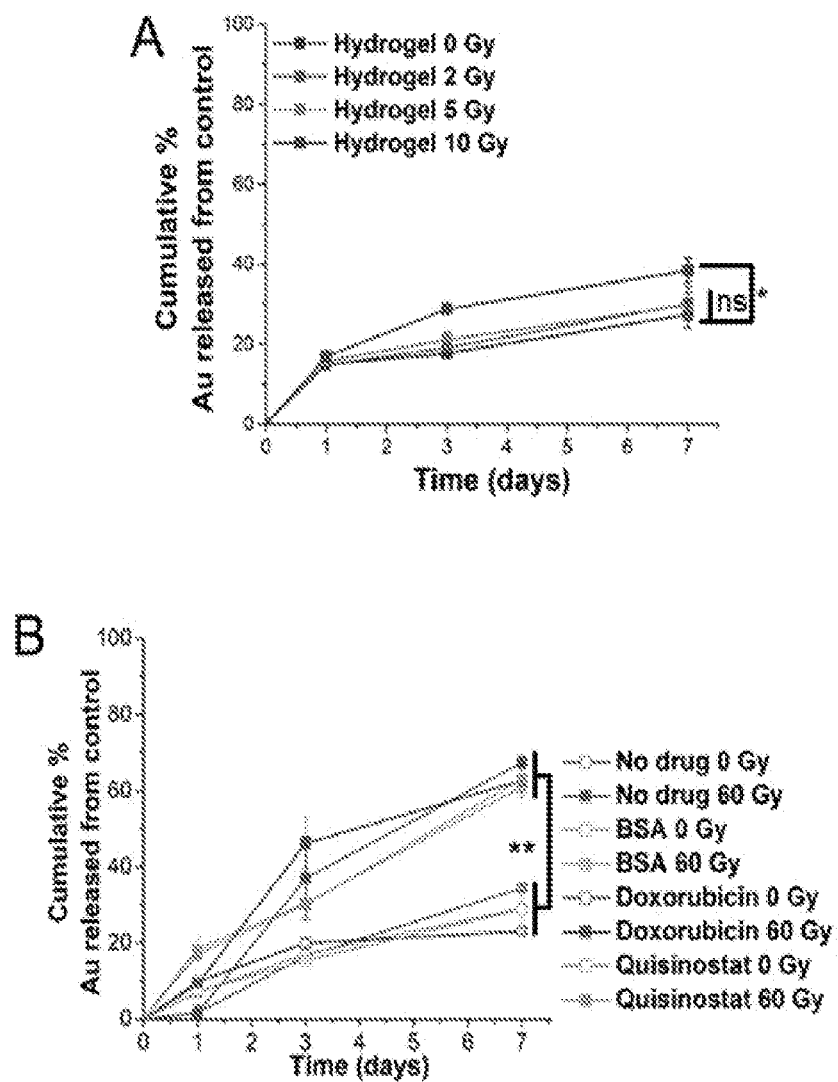
FIGS. 15A to 15D illustrates the influence of X-rays on the release rate of payloads from hydrogel and its mechanical properties. Quantification of the released gold from the hydrogel irradiated with low X-ray doses of 0 Gy (violet) or 2 Gy (blue) or 5 Gy (pink) or 10 Gy (purple) is shown in FIG. 15A.
Figure 15C:
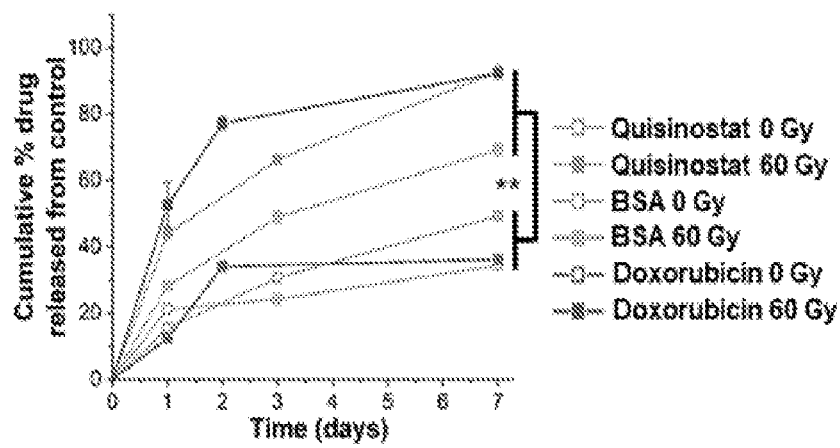
Figure 15D:
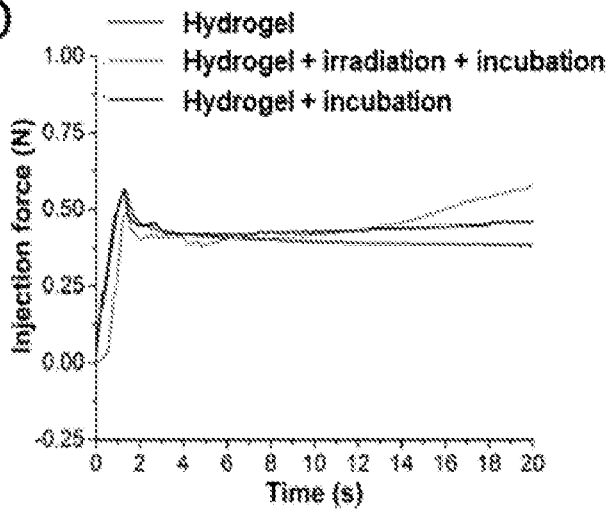

The biocompatibility of the Se-PCPP hydrogel without drug loading was evaluated on a range of cancer and non-cancer cells to confirm the non-toxicity of both the hydrogel matrix and its degradation byproducts due to irradiation. No significant decrease in cell viability was observed using LIVE-DEAD assay after 8 hours incubation of Se-PCPP with healthy cells (HepG2, SVEC4 and Renca), as well as GBM cells (U251 and NS039), thus suggesting the in vitro tolerability of the hydrogel (FIG. 15A). Furthermore, the radiation degraded hydrogel did not show any decrease in cell viability after 8 hrs incubation with U251 and NS039 GBM cells, hence indicating that no toxicity arises in vitro from the degradation byproducts of the hydrogel itself (FIG. 15B).

Figures 6A, 6B, 6C, 6D:
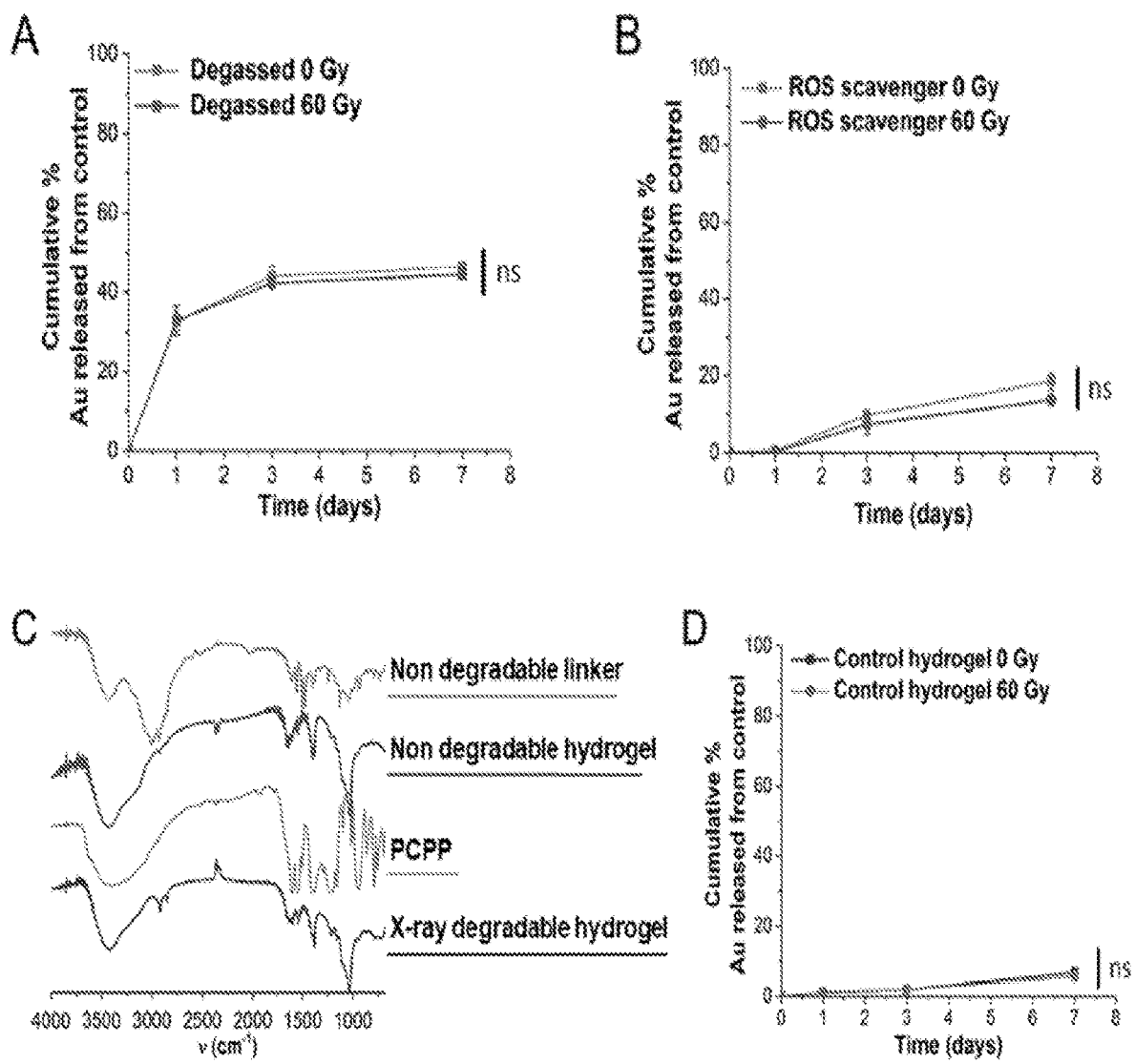
FIGS. 6A-6D depicts results from an investigation of the mechanism of radiation triggered degradation of the Se-PCPP hydrogel. Quantification of the gold release from the Se-PCPP hydrogel after irradiation with either 0 Gy (grey) or 60 Gy (red) is shown in a degassed medium in FIG. 6A and in a ROS scavenging medium in FIG. 6B. Probing the role of selenocystamine degradation on hydrogel radiation responsiveness via comparison with a control non-radiation sensitive cross-linker: chemical composition confirmation by FT-IR (FIG. 6C) and quantification of the gold release from the non-radiation sensitive hydrogel (FIG. 6D). 'ns' indicates non-significant differences with $p>0.05$.

Di-selenium containing molecules have rarely been reported to be degradable after radiation mediated production of radical oxygen species (ROS). To provide more evidence that the radiation triggered degradation of the hydrogel stems from the selenocystamine cross-linker, we investigated the effect of radiation on the Se-PCPP hydrogel incubated in either degassed or ROS scavenging media. In such media, the release profile of AuNP from the Se-PCPP hydrogel was unaffected due to the 60 Gy irradiation compared with mock irradiation, therefore suggesting that radiation induced ROS production triggers the hydrogel degradation (FIGS. 6A and 6B). Finally, to confirm that radiation sensitivity arises from the selenocystamine cross-linker rather than polymer radiolysis, a control hydrogel termed C-PCPP was formulated using a radiation insensitive analog of selenocystamine, hexamethylenediamine, as a cross-linker (FIG. 6C). The release profile of AuNP from C-PCPP was evaluated after irradiation with 60 Gy and did not show a significant difference of its release profile compared to mock irradiation, thus supporting the role of selenocystamine as a radiation degradable cross-linker (FIG. 6D).

Figures 7A, 7B, 7C, 7D:
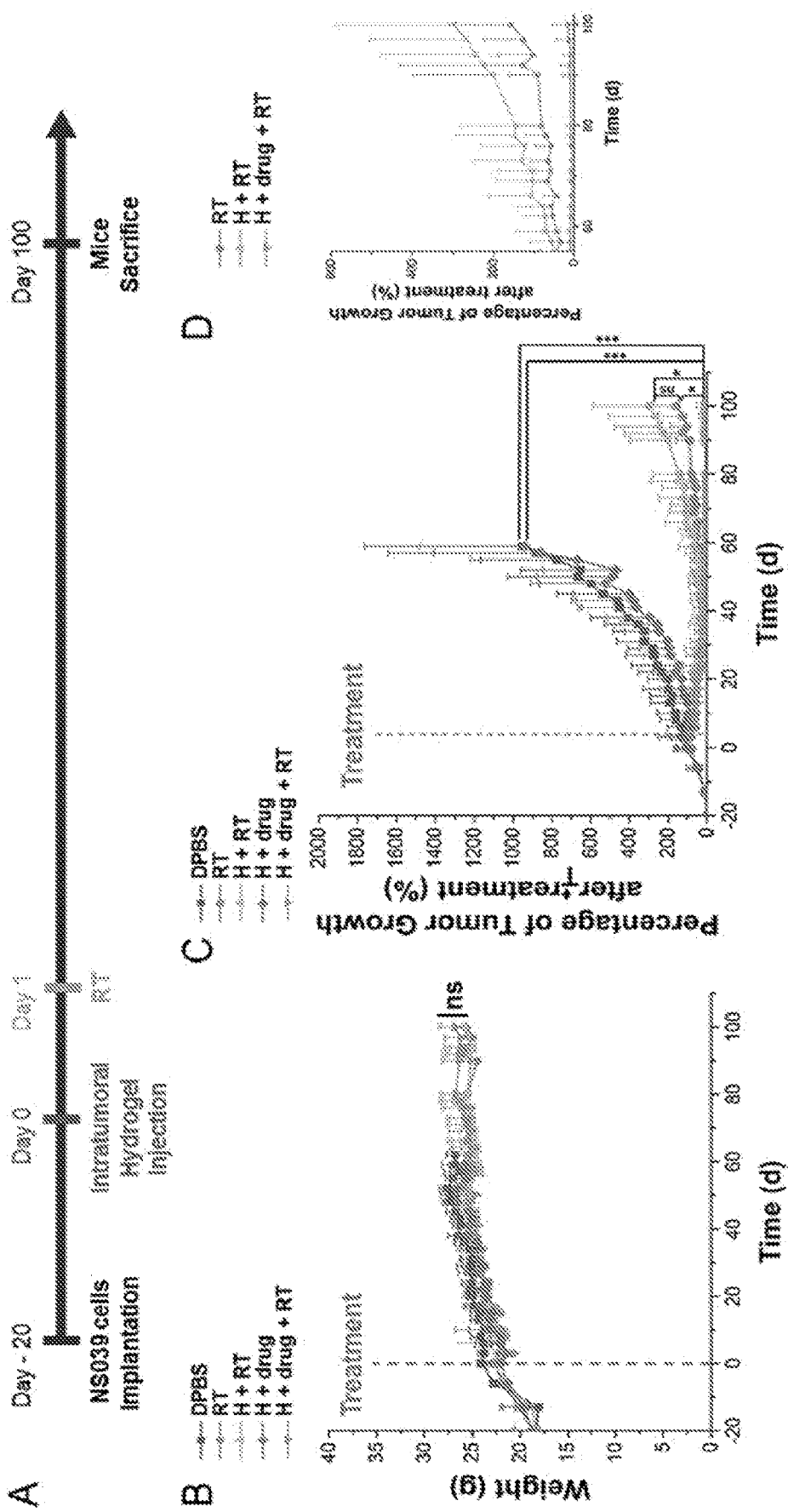

High Therapeutic Efficiency and Prevention of Relapse Achieved by Combination of the Drug Loaded Se-PCPP Hydrogel and Irradiation The in vivo potential for Se-PCPP hydrogel at inhibiting GBM tumor growth by combination therapy (radiation triggered drug delivery and radiotherapy), was investigated on nude mice xenografted with human GBM tumors. NS039 cells were subcutaneously implanted into the right flank of athymic nude mice and allowed to grow to 100 mm$^3$ volume. Mice were first administered DPBS (groups DPBS and RT) or Se-PCPP hydrogel (groups H+RT, H+drug or H+drug+RT) intra-tumorally (FIG. 7A). 24 hours post-injection, mice received a local radiotherapy treatment of 10 Gy (groups RT, H+RT, or H+drug+RT). Of note, a 10 Gy dose was chosen due to the limitations in the radiation dose possible to administer to mice as a single dose with minimal normal tissue toxicity. The mice neither showed a loss of weight, nor a decrease in activity or appetite over the course of the experiment, suggesting the high tolerability to Se-PCPP hydrogel and the absence of apparent systemic toxicity (FIG. 7B).

Strong tumor growth inhibition was successfully achieved thanks to the combination of the drug loaded Se-PCPP hydrogel with radiation therapy, and was found to be statistically different to the control groups. Moreover, a complete response (CR) to the treatment occurred in 4 mice out of 6 among the group 'H+drug+RT', and no relapse was observed over the course of the experiment. These results support the high therapeutic efficiency achieved thanks to the drug loaded Se-PCPP hydrogel in combination with radiotherapy for the successful treatment of GBM and long-term prevention of the primary tumor recurrence. In comparison, treatment with the drug loaded hydrogel in the absence of radiation therapy, group 'H+drug', showed no response, possibly due to the slow drug release kinetics occurring by passive elution. This suggests that drug delivery through elution is too slow compared to the tumor growth rate, hence supporting the importance of the stimulus-responsiveness of the Se-PCPP hydrogel for 'on-demand' drug delivery in the treatment of GBM (FIG. 7D). On the other hand, while both the radiotherapy alone and its combination with the hydrogel without drug showed a partial response (PR) over the first 40 days subsequent to radiotherapy, mice were found to relapse, leading to markedly larger tumors than the group 'H+drug+RT'. Overall, the cohort treated with drug loaded hydrogel combined with radiation demonstrated high levels of complete response, compared to all other groups.

Se-PCPP Hydrogel Degradation Monitoring by CT

Figure 8A:
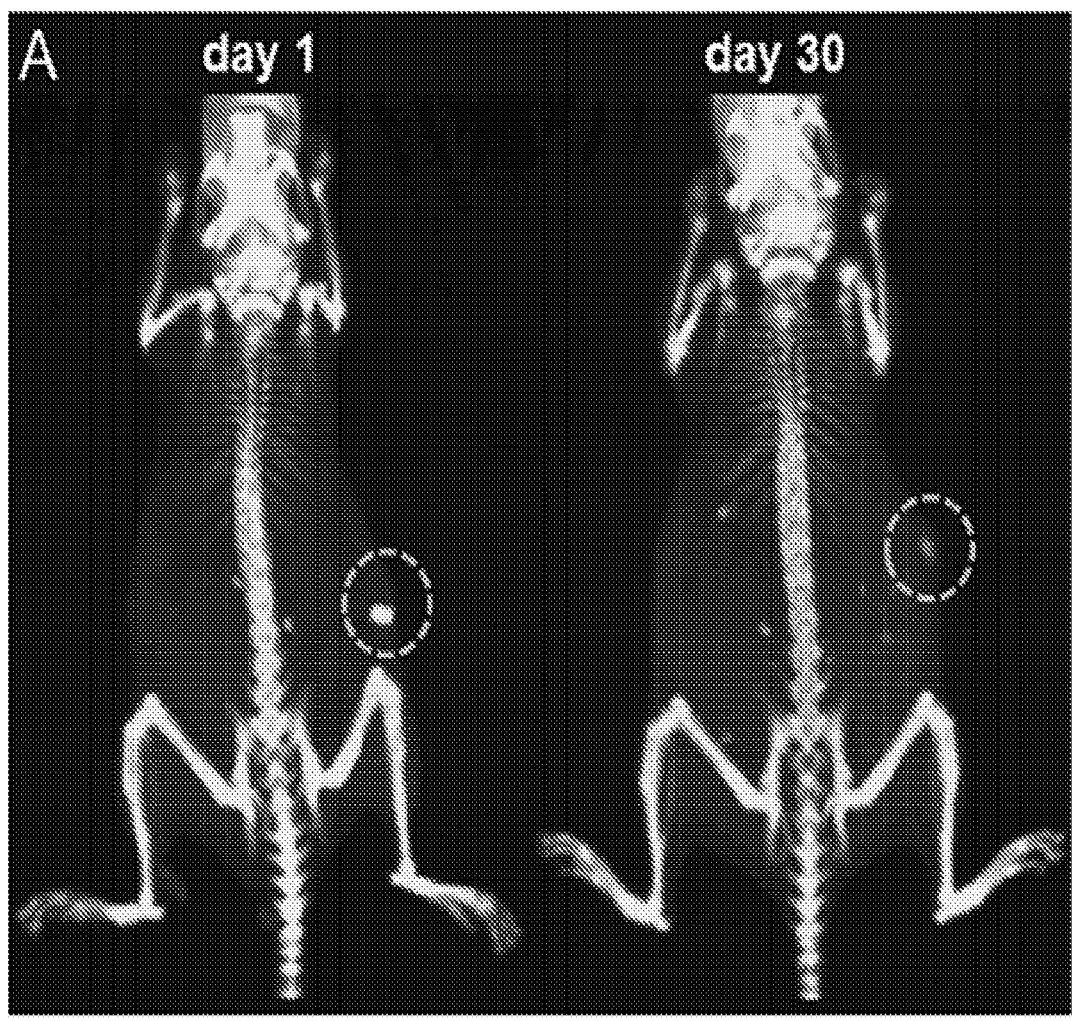
FIGS. 8A-8B depicts in vivo hydrogel monitoring by CT.
Figure 8B:
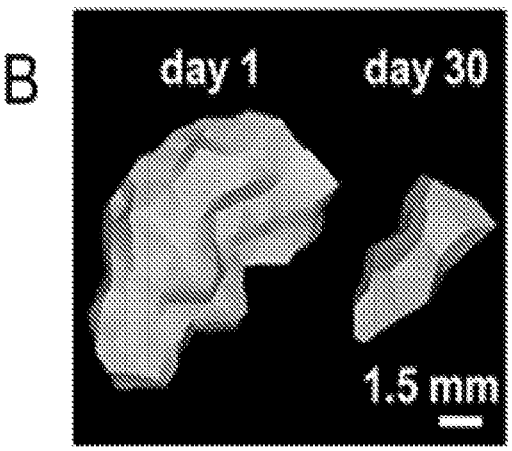
Figure 8C:
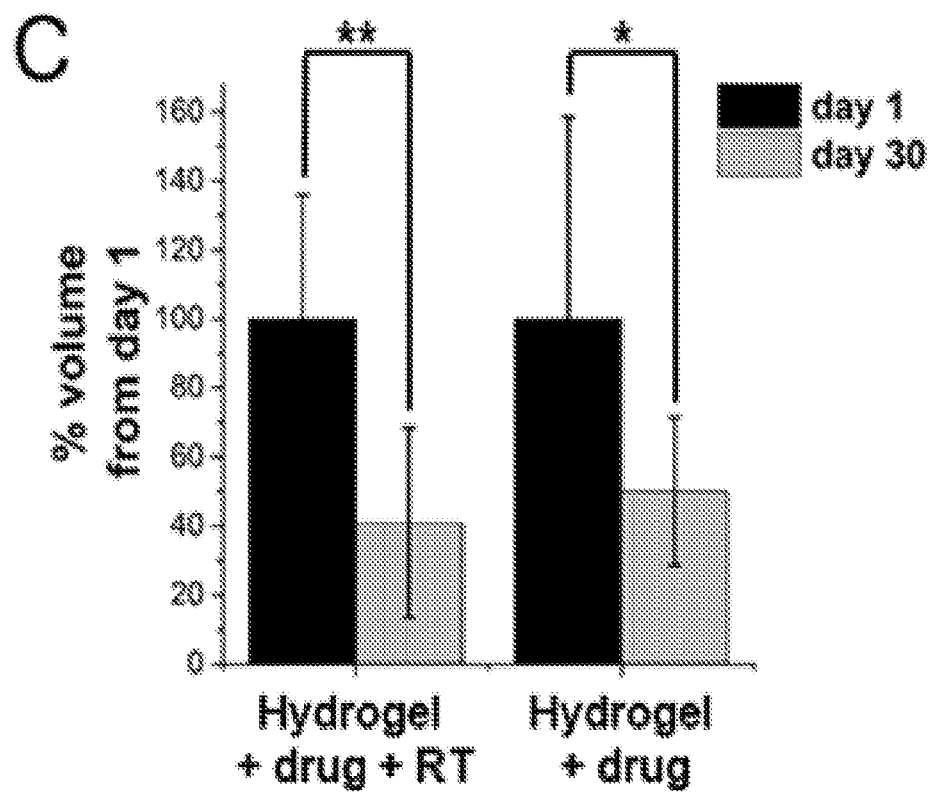
FIG. 8C depicts quantification of the hydrogel degradation by comparing the volume change (n=6).

Imaging the injected hydrogel and monitoring its fate is of importance to gain insights into the delivery kinetic of payloads, and to confirm its biodegradability. To address the long-term monitoring of the radiopaque Se-PCPP hydrogel, we used CT imaging which allows both the tracking of the AuNP payload in the hydrogel and its quantification, and fits with the clinical regimen. The dense concentration of AuNP in the hydrogel granted its visualization and delineation from the surrounding tumor tissues over the course of the experiment (FIG. 8A). Using a region growing method, we were able to segment the hydrogel from the surrounding tissues based on contrast enhancement thresholds, and to reconstruct it as 3D image (FIG. 8B). The reconstructed hydrogel showed a compact distribution at the injection site in the tumor, suggesting that the hydrogel maintained its mechanical properties after injection. Moreover, the volume decrease of the hydrogel could be determined based on CT scans at different time points to evaluate its biodegradability. From 1 day to 30 days post-injection, the volume of the hydrogels is found to significantly decrease to 41% and 50% for the mice that received 10 Gy or mock irradiation respectively (FIG. 8C). Similarly, contrast enhancement from the hydrogels is decreased by half at the later time point, compared to the contrast enhancement displayed at 1-day post-injection (FIG. 8D). Hence, hydrogel monitoring using CT confirmed the successful in vivo biodegradability of the Se-PCPP hydrogel over time.

Biodistribution of Released AuNP and Pathology Investigation

Figure 16A:
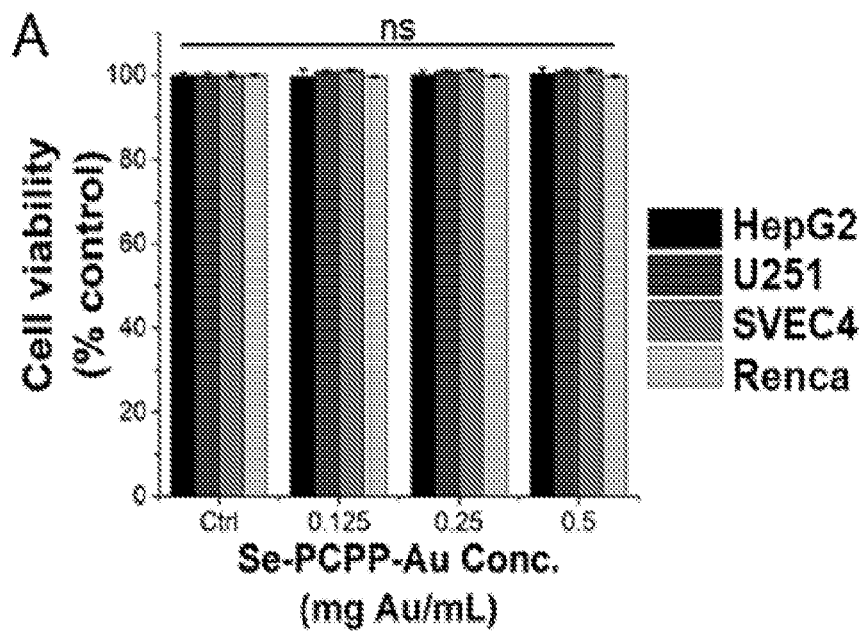
FIG. 16A depicts viability of cell lines determined by LIVE-DEAD assay upon 8 hours treatment with media conditioned with the AuNP-loaded Se-PCPP hydrogel. FIG.
Figure 16B:
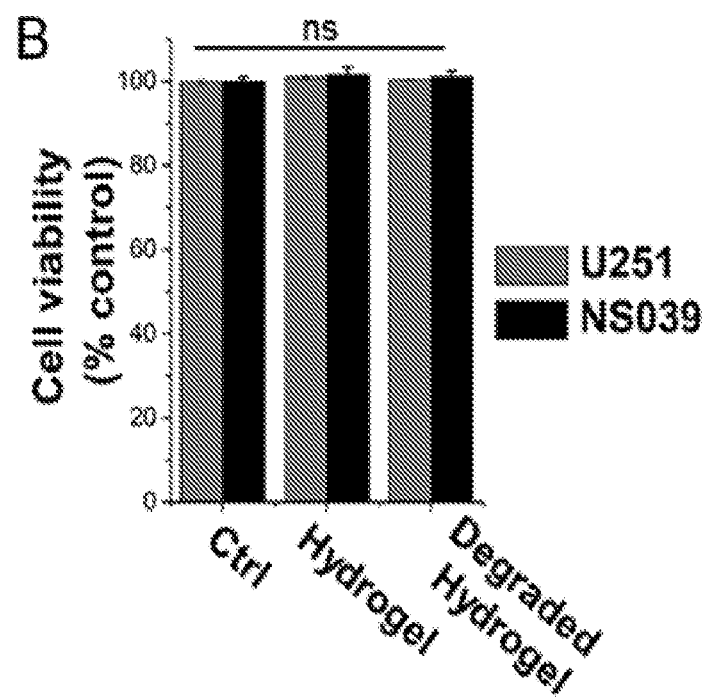

Furthermore, AuNP of 3.8±0.4 nm core diameter were chosen for loading in the Se-PCPP hydrogel owing to their excretion profile through kidneys and urine. Hence, such excretable AuNP are advantageous for avoiding long term toxicity and body retention. To confirm the minimal retention of released AuNP in group 'H+drug+RT', major organs were processed for gold quantification by ICP-OES (FIG. 16). As expected, very low concentrations of gold are found in the major organs, the overall sum of gold content in major organs representing 12% of the ID/g. On the other hand, the highest concentration of gold, i.e. 5% ID/g was found in the tumor, and corresponds to the undegraded hydrogel at the injection site. Moreover, very low concentrations of gold are found in the organs of the mononuclear phagocyte system (MPS), i.e. spleen and liver, which supports the excretion of the AuNP via the kidneys.

To assess the in vivo tolerability of the Se-PCPP hydrogel and the negligible body accumulation of AuNP, the histopathological examination of major organs was performed (FIG. 16). Comparison of representative slices between the control group 'DPBS' and the group 'H+drug+RT' group, whom was administered the drug loaded hydrogel in addition of radiotherapy, shows no obvious histopathological lesions or structural differences (FIG. 17). These preliminary findings support the high tolerability for the quisinostat loaded Se-PCPP hydrogel over long-term and indicate the in vivo safety of the hydrogel and its degradation byproducts.

Altogether, the treatment proposed herein, combining the quisinostat loaded Se-PCPP hydrogel with radiotherapy, highlights this novel radiation responsive hydrogel as an effective drug delivery platform in the treatment of GBM to prevent relapse of the primary tumor. The acute tumor growth inhibition properties observed using this combination treatment allowed to significantly minimize the tumor proliferation and resulted in a CR rate of 67% in the group 'H+drug+RT'. Loading both the drug and AuNP in the Se-PCPP hydrogel allowed their enhanced retention in the tumor compared to intravenous administration, which probably accounts for the high therapeutic efficiency observed herein. In effect, the advantageous therapeutic outcome in the treatment of GBM offered by drug loaded hydrogels over the free drug administration has been reported by the group of Préat and was suggested to arise in part from the enhanced drug retention time in the diseased area. Likewise, the enhanced retention time of AuNP is of interest for fractionated radiosensitization of GBM, considering the post-operative window following the main tumor resection which is required clinically, prior to administrating the radiotherapy. A promising strategy to address longer retention time in GBM relies onto the design of actively targeted AuNP. Alternatively, it is reported herein the use of AuNP loaded in a hydrogel to retain AuNP for over 100 days at the injection site, which is advantageous for personalized medicine by radiosensitization. Similarly, Zhang et al. Biomaterials 2016, 106, 13-23, showed the longer retention time in the tumor achieved by injection of a thermogelling hydrogel composed of SPION and polyphosphazene over the SPION suspension, and allowed enhanced therapeutic efficiency by hyperthermia.

Moreover, the loading of AuNP in the hydrogel was found to be an asset for monitoring the degradability and fate of the hydrogel by CT. Gaining insights into the behavior and outcomes of hydrogels in vivo is of importance as erosion rates may differ from those observed in vitro, and follow-up of the in vivo behavior of hydrogels is required for clinical translation. It has been reported by others that an iodinated hydrogel based on mPEG-PLGA diblock polymer, whose behavior in vivo and change in morphology over time could be tracked using CT imaging. Thus, they have shown the steady decrease in volume and HU values over one week, and finally confirmed by anatomic observation the complete absorption of the gel after seven days. Alternatively, the in vivo tracking of the erosion of hydrogels can be performed by fluorescence using tagged polymers. A polymer having an aggregation induced emission (AIE) behavior was used for the in vivo spatiotemporal follow-up of its erosion by fluorescence measurement, showing an intra-tumoral residence time of up to 18 days. In comparison, the Se-PCPP hydrogel reported herein showed a long-term residence in the tumor area after administration of the radiation trigger, and 50% of the contrast enhancement observed in CT was maintained 30 days post-injection in group 'H+drug+RT'. Those results indicate that Se-PCPP hydrogel is beneficial for the purpose of slow drug delivery over long-term, and to durably prevent the recurrence of GBM. Overall, the anti-cancer efficiency of the Se-PCPP hydrogel compares favorably with other hydrogels used as drug delivery platforms for the treatment of GBM.

Finally, the long-term survival observed after hydrogel administration, in addition to the absence of side effects, confirm the in vitro findings, that suggest their favorable tolerability for further investigation as a stimulus-responsive platform for drug delivery. Accordingly, to progress toward clinical translation of this hydrogel, additional investigation of the possible inflammation or microglia activation in the surrounding tissues will be required. However, the preliminary tolerability results observed herein correlate with previous reports showing the high safety profile of polyphosphazene based hydrogels in murine model or larger animals, reinforcing the potential of polyphosphazene based biomaterials for the delivery of bioactive substances.

The present study stands as a proof-of-concept for the opportunities offered by selenocystamine cross-linked hydrogel for the radiation triggered drug delivery. Other external stimuli, such as light or ultrasound radiation, have depth penetration limits, which can hinder their use for tumors such as GBM. In contrast, radiation administration during radiotherapy offers a promising alternative due its ability to target deep seated tumors. Examples of radiation sensitive materials based on poly(olefin sulfone)s, and hyaluronic acid, have been studied. Nevertheless, they typically require high doses of radiation to trigger the radiolysis induced degradation of their polymer backbone, which hinders their use for biomedical application. Contrastingly, di-selenium bond is highly sensitive to redox changes and consequently has been mostly investigated as redox-responsive biomaterials. An early report by the group of Zhang established the potential of di-selenium containing block co-polymer to form micelles that showed enhanced degradation and drug release after irradiation. This was supported by Xu et al, who demonstrated the radiation sensitivity of a di-selenium containing polymer to high radiation doses. Accordingly, progress toward enhancing the sensitivity of our Se-PCPP hydrogel toward lower doses of radiation is required to facilitate their application to a GBM resection model that would mimic more accurately the pathophysiological condition of GBM patient. Hence, systems functionalized with tellurium instead of selenium have shown promising results for the radiation-responsive delivery of drugs, and would be of interest for future development of our Se-PCPP hydrogel. However, FLASH radiotherapy (FLASH-RT), where high doses of radiation are delivered at an ultra-high dose rate, may be directly applicable to our current platform. FLASH-RT has gathered intense interest based on recent reports suggesting its enhanced therapeutic efficacy while minimizing the toxicity to the surrounding tissues compared to conventional RT used in clinical setup. In fact, minimal impairment in location and recognition task was observed in mice treated by FLASH-RT compared to conventional RT. This beneficial differential effect is advantageous for a better management of GBM and its combination to our radiation sensitive drug delivery hydrogel would be appealing.

Overall, the easy production of the hydrogel, its adaptability and moderate stiffness are beneficial for a convenient and standardized administration. Moreover, the tolerability of both the hydrogel and its degradation byproducts, observed in vitro and in vivo, make this novel Se-PCPP hydrogel a promising platform with advantageous translational abilities for patient care in the treatment of GBM. Furthermore, the adaptability of the presented hydrogel to deliver high quantities of payloads, ranging in nature from small, hydrophobic molecules, to much larger, hydrophilic proteins or AuNP, foreshadows its use for a broader range of drugs in the management of cancer or other diseases such as diabetes. Likewise, loading of other contrast agents in Se-PCPP hydrogel would be of interest to access a broader range of imaging modalities. For example, the loading of cobalt ferrite nanoparticles would allow the monitoring by MRI of the hydrogel distribution by T2 weighed negative contrast, while the possible recurring tumor could be concomitantly observed by T1 weighed positive contrast.

CONCLUSION

In this study, a promising treatment is shown for GBM using an injectable Se-PCPP hydrogel, capable of drug release upon a radiation trigger. It allows the delivery of an effective anti-GBM drug, quisinostat, while averting the systemic toxicity of this drug. A di-selenium cross-linker was used to grant precise degradability by radiation, and significantly enhanced the in vitro drug release profile. Moreover, the in vivo results confirmed the strong tumor inhibition capability of this drug loaded hydrogel in combination with radiotherapy, showing an elevated rate of CR, and preventing relapse over a long-term. Furthermore, monitoring the long residence time of the hydrogel, and its in vivo biodegradability was possible due to the radiopaque AuNP loaded in the hydrogel. Finally, the long-term tolerability of this hydrogel and its degradation byproducts was confirmed both in vitro and in vivo, showing no side effects on the animal health, and no abnormalities on the organ structure, as supported by pathological investigations. Overall, this hydrogel presents beneficial features for the combination therapy of GBM, without inducing visible side effects, and its adaptability allows for loading of high payloads of drugs and nanoparticles, thus foreshadowing its potential as an 'on-demand' drug delivery biomaterial for personalized medicine.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A hydrogel comprising:
a biodegradable polyphosphazene polymer
a radiation-sensitive diselenide cross-linker; and
one or more payloads releasably loaded within the hydrogel.

2. The hydrogel of claim 1, wherein the polyphosphazene comprises a polycarboxylate polymer.

3. The hydrogel of claim 2, wherein the polycarboxylate polymer comprises di(carboxylatophenoxy)phosphazene (PCPP).

4. The hydrogel of claim 1, wherein the radiation-sensitive cross-linker comprises one or more selected from the group consisting of: selenocystamine, 3,3'-diselenodipropionic acid, 4,4'-diselenodibutanoic acid, 5,5'-diselenodipentanoic acid, diselenium functionalized polyurethane, and diselenium functionalized dextran.

5. The hydrogel of claim 1 wherein the radiation is one or more selected from the group consisting of: acoustic radiation, electromagnetic radiation and particle radiation.

6. The hydrogel of claim 5, wherein the electromagnetic radiation comprises X-ray radiation.

7. The hydrogel of claim 5, wherein the particle radiation comprises proton therapy or radioisotope decay.

8. The hydrogel of claim 7, wherein the radioisotope decay comprises cobalt-60 decay.

9. The hydrogel of claim 5, wherein the acoustic radiation comprises focused ultrasound radiation.

10. The hydrogel of claim 1, wherein the one or more payloads are selected from the group consisting of: nanoparticles and one or more chemotherapeutic agents.

11. The hydrogel of claim 10, wherein the nanoparticles are selected from the group consisting of: gold nanoparticles (AuNP) and silver sulfide nanoparticles ($Ag_2S$ NP), gadolinium nanoparticles, europium nanoparticles, bismuth nanoparticles, iron oxide-containing nanoparticles, silver nanoparticles, tantalum nanoparticles, ytterbium nanoparticles, tungsten nanoparticles, alloys including one or more thereof, compounds including one or more thereof, and any combinations thereof.

12. The hydrogel of claim 10, wherein the nanoparticles have a maximum cross-sectional dimension between about 1 nm and about 150 nm.

13. The hydrogel of claim 10, wherein the nanoparticles have a maximum cross-sectional dimension less than about 5 nm.

14. The hydrogel of claim 10, wherein the one or more chemotherapeutic agents are selected from the group consisting of: doxorubicin, quisinostat, carboplatin, cisplatin, paclitaxel, albumin-bound paclitaxel, docetaxel, gemcitabine, vinorelbine, irinotecan, etoposide, vinblastine, imiquimod, resiquimod, and pemetrexed.

15. A method comprising:
introducing the hydrogel of claim 1 adjacent to malignant or marginal tissue; and
administering radiation to the hydrogel, thereby disrupting the cross-linkers and releasing the one or more payloads.

16. The method of claim 15, wherein the hydrogel is introduced by injection or after resection of malignant tissue.

17. The method of claim 15, wherein radiation is one or more selected from the group consisting of: electromagnetic radiation and particle radiation.

18. The method of claim 15, wherein the radiation is administered after a period of time from the introduction of the hydrogel, the period of time being selected from the group consisting of: between 1 hour and 1 week, between 1 week and 2 weeks, between 2 weeks and 3 weeks, between 3 weeks and 4 weeks, between 4 weeks and 8 weeks, between 8 weeks and 12 weeks, between 12 weeks and 16 weeks, and greater than 16 weeks.

19. The method of claim 15, wherein:
the administering step is repeated a plurality of times; and
the hydrogel releases a portion of the payload after each repetition.

20. A hydrogel comprising:
di(carboxylatophenoxy)phosphazene (PCPP);
a selenocystamine cross-linker;
a gold nanoparticle (AuNP); and
quisinostat.

\* \* \* \* \*